(12) United States Patent
Hibayashi et al.

(10) Patent No.: US 9,547,191 B2
(45) Date of Patent: Jan. 17, 2017

(54) LIQUID CRYSTAL DISPLAY

(71) Applicant: TOPPAN PRINTING CO., LTD., Tokyo (JP)

(72) Inventors: Yasuhiro Hibayashi, Tokyo (JP); Koichi Minato, Tokyo (JP); Kenzo Fukuyoshi, Tokyo (JP); Manabu Ito, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 124 days.

(21) Appl. No.: 14/293,558

(22) Filed: Jun. 2, 2014

(65) Prior Publication Data
US 2014/0267955 A1    Sep. 18, 2014

Related U.S. Application Data

(63) Continuation of application No. PCT/JP2012/075826, filed on Oct. 4, 2012.

(30) Foreign Application Priority Data

Dec. 7, 2011  (JP) ................................. 2011-268138
Jul. 10, 2012  (JP) ................................. 2012-154540

(51) Int. Cl.
*G02F 1/1333*    (2006.01)
*G06F 3/041*    (2006.01)
(Continued)

(52) U.S. Cl.
CPC ....... *G02F 1/13338* (2013.01); *G02F 1/13318* (2013.01); *G02F 1/133512* (2013.01);
(Continued)

(58) Field of Classification Search
None
See application file for complete search history.

(56) References Cited

U.S. PATENT DOCUMENTS 5,900,625 A * 5/1999 Baumgartner .......... H03F 1/303
                                                    250/214 A
6,037,643 A * 3/2000 Knee ................. H01L 27/14603
                                                    257/231
(Continued)

FOREIGN PATENT DOCUMENTS

JP          10-171599        6/1998
JP          2002-335454      11/2002
(Continued)

OTHER PUBLICATIONS

English translation of WO 2011129131 A1, which is US 2013/0027354 A1, Title: Display Device, Author: Kohji Yabuta; Noma Mikihiro; Date of publication: Oct. 20, 2011.*

(Continued)

*Primary Examiner* — Dung Nguyen
*Assistant Examiner* — Shan Liu

(57) ABSTRACT

A liquid crystal display according to an embodiment includes a first light-emitting device that emits short-wavelength light of a wavelength 360 nm to 420 nm and a second light-emitting device that emits visible light. Electrodes of the liquid crystal display includes a light-guiding electrode that drives a liquid crystal contained in the liquid crystal layer to emit the short-wavelength light and a pixel electrode that drives the liquid crystal contained in the liquid crystal layer to emit the visible light. The photoreceptors are each a phototransistor including a transparent channel layer containing two metallic oxides or more from gallium, indium, zinc, hafnium, tin, and yttrium. The photoreceptors include a first photoreceptor overlaps with the blue filter in the plan view and a second photoreceptor overlaps with the green filter, the red filter, or the black matrix in the plan view.

13 Claims, 21 Drawing Sheets

(51) Int. Cl.
*G06F 3/042* (2006.01)
*G02F 1/133* (2006.01)
*G02F 1/1343* (2006.01)
*G02F 1/1335* (2006.01)

(52) U.S. Cl.
CPC .. *G02F 1/133514* (2013.01); *G02F 1/134309* (2013.01); *G06F 3/0412* (2013.01); *G06F 3/0421* (2013.01); *G02F 1/133509* (2013.01); *G06F 2203/04103* (2013.01); *G06F 2203/04107* (2013.01)

(56) References Cited

U.S. PATENT DOCUMENTS

| | | | | |
|---|---|---|---|---|
| 8,199,083 B2* | 6/2012 | Fukunaga | ............ | G06F 3/0421 345/73 |
| 8,816,285 B2* | 8/2014 | Katoh | ............ | G06F 3/0412 250/349 |
| 2003/0218180 A1* | 11/2003 | Fujiwara | ............ | H01L 33/504 257/100 |
| 2005/0073625 A1* | 4/2005 | Daiku | ............ | G02F 1/133615 349/64 |
| 2005/0151830 A1* | 7/2005 | Yamazaki | ............ | H01L 27/322 347/238 |
| 2006/0267905 A1* | 11/2006 | Nishino | ............ | G02F 1/1323 345/98 |
| 2007/0268206 A1* | 11/2007 | Kinoshita | ............ | G06F 3/0412 345/30 |
| 2008/0036951 A1* | 2/2008 | Tsai | ............ | G02F 1/13338 349/110 |
| 2009/0033850 A1* | 2/2009 | Ishiguro | ............ | G02F 1/13338 349/116 |
| 2009/0161051 A1 | 6/2009 | Fukunaga et al. | | |
| 2009/0268132 A1* | 10/2009 | Takama | ............ | G02F 1/13338 349/106 |
| 2009/0295760 A1* | 12/2009 | Linge | ............ | G06F 3/0412 345/179 |
| 2011/0042766 A1 | 2/2011 | Kurokawa et al. | | |
| 2011/0043486 A1* | 2/2011 | Hagiwara | ............ | G02F 1/133514 345/175 |
| 2011/0109591 A1 | 5/2011 | Kurokawa et al. | | |
| 2011/0109592 A1* | 5/2011 | Kurokawa | ............ | G06F 3/0412 345/175 |
| 2011/0181818 A1* | 7/2011 | Minato | ............ | G02B 5/201 349/106 |
| 2012/0018719 A1* | 1/2012 | Zan | ............ | H01L 31/1013 257/43 |
| 2012/0057379 A1* | 3/2012 | Aiello | ............ | H02M 1/36 363/49 |
| 2012/0268701 A1* | 10/2012 | Nemoto | ............ | G02F 1/13338 349/106 |
| 2013/0027354 A1* | 1/2013 | Yabuta | ............ | G06F 3/042 345/175 |

FOREIGN PATENT DOCUMENTS

| | | | | |
|---|---|---|---|---|
| JP | 2007-18458 | 1/2007 | | |
| JP | 2007-310628 | 11/2007 | | |
| JP | 2009-151020 | 7/2009 | | |
| JP | 2009-151039 | 7/2009 | | |
| JP | 2010-186997 | 8/2010 | | |
| JP | 2011-118888 | 6/2011 | | |
| TW | 201145121 | 12/2011 | | |
| TW | 201207491 | 2/2012 | | |
| WO | WO 2009/116205 A1 | 9/2009 | | |
| WO | WO 2011074581 A1 * | 6/2011 | ............ | G06F 3/0412 |
| WO | WO 2011129131 A1 * | 10/2011 | ............ | G06F 3/042 |
| WO | WO 2012014817 A1 * | 2/2012 | ............ | G06F 3/0412 |

OTHER PUBLICATIONS

International Preliminary Report on Patentability mailed on Jun. 19, 2014 in corresponding International Patent Application No. PCT/JP2012/075826, in English.
International Search Report mailed Nov. 20, 2012 in corresponding International Patent Application No. PCT/JP2012/075826.
Taiwanese Office Action dated May 19, 2015 in corresponding Taiwanese Patent Application No. 101140028.

* cited by examiner

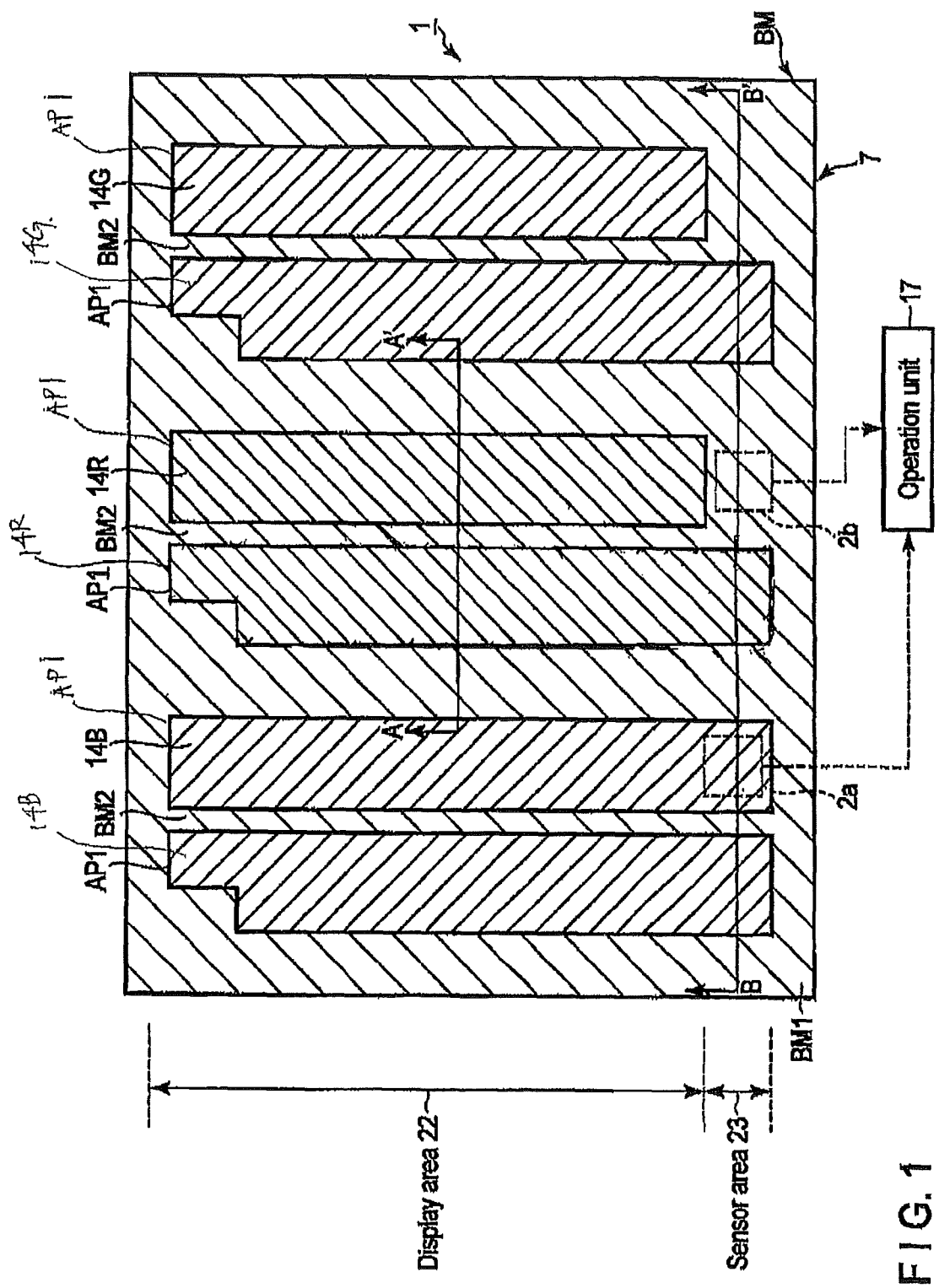
F I G. 1

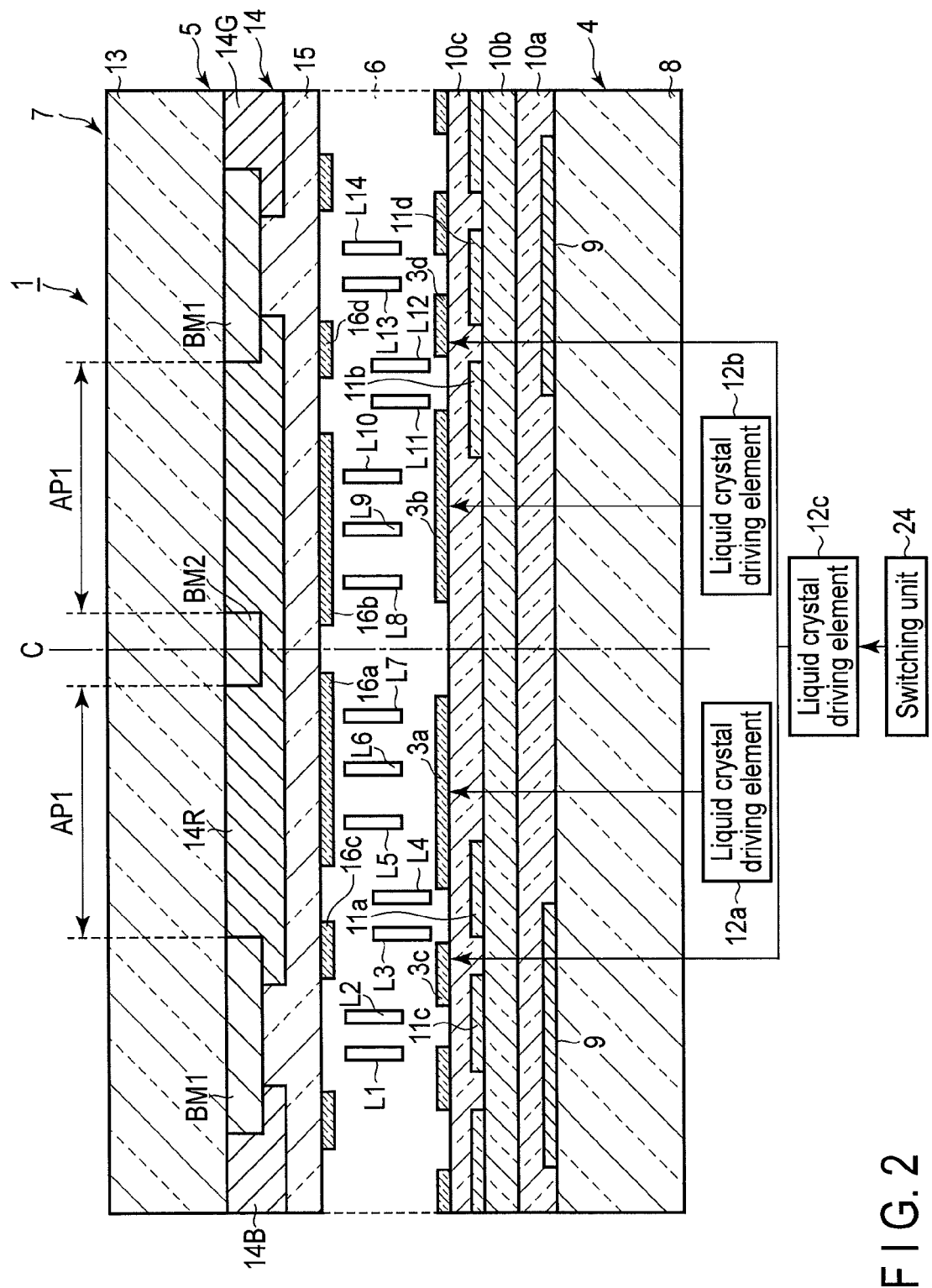
F I G. 2

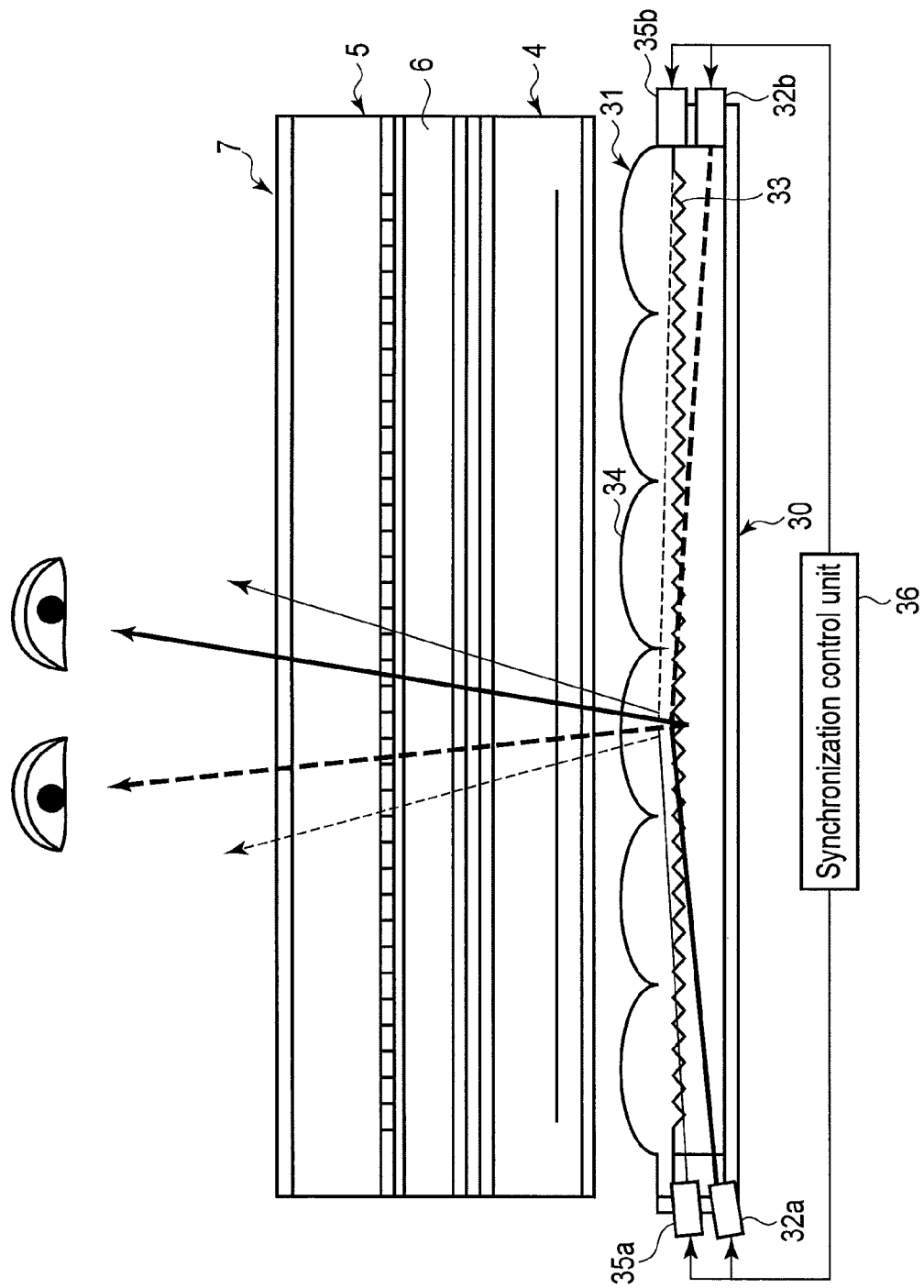
F I G. 5

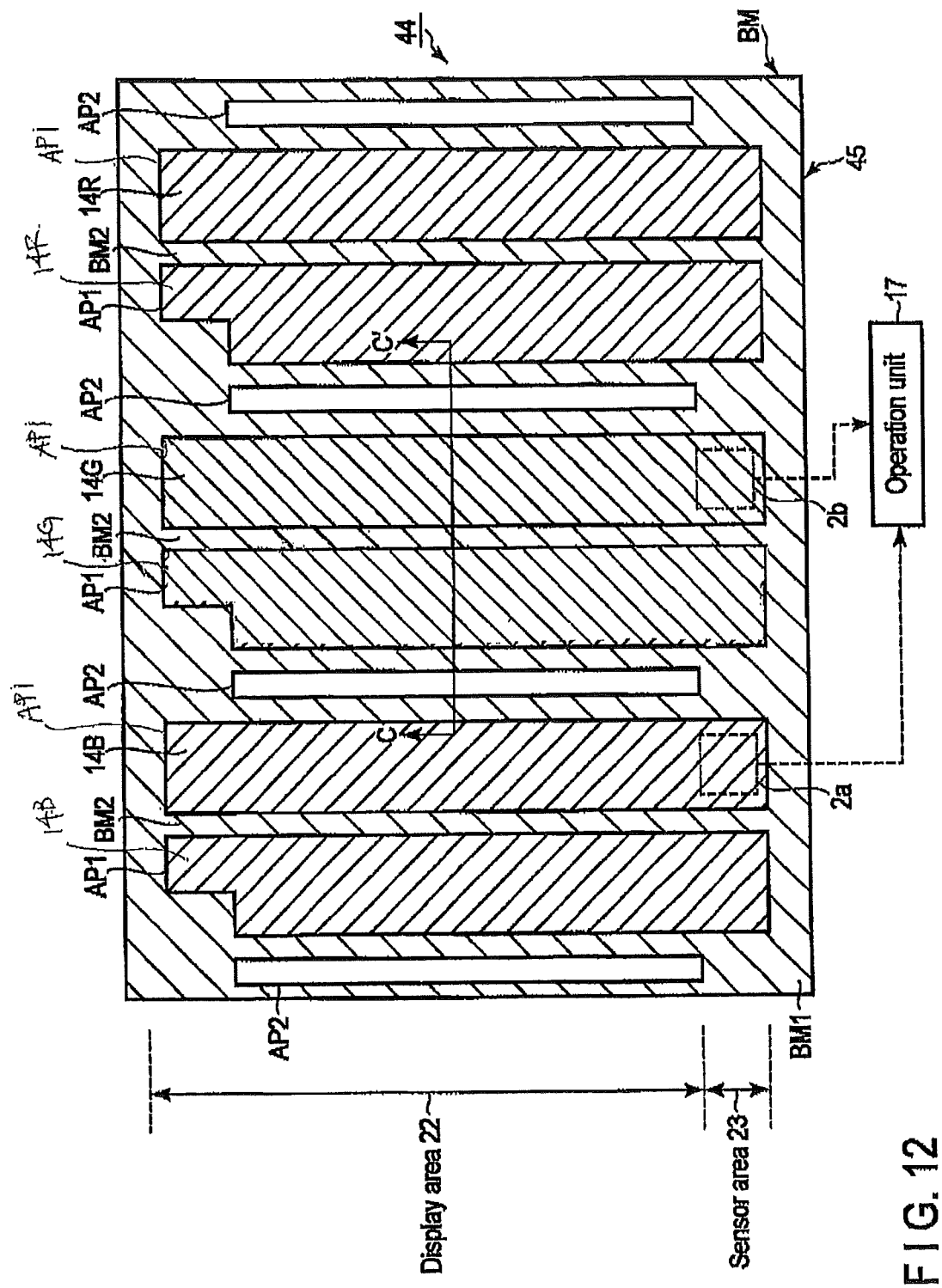
F I G. 12

LIQUID CRYSTAL DISPLAY

CROSS-REFERENCE TO RELATED APPLICATIONS

This application is a continuation application of International Patent Application No. PCT/JP2012/075826 filed Oct. 4, 2012 and claims foreign priority benefit of Japanese Patent Applications No. 2011-268138 filed Dec. 7, 2011, and No. 2012-154540 filed Jul. 10, 2012, in the Japanese Intellectual Property Office, the contents of which are incorporated herein by reference.

TECHNICAL FIELD

Embodiments described herein relate generally to a liquid crystal display including photoreceptors.

BACKGROUND ART

In recent years, electronic devices using a liquid crystal display have been reduced in weight. For example, the liquid crystal display is used in information devices such as mobile phones and mobile PCs. Regarding the operation of information devices, for example, a technology to enable direct input to a liquid crystal display screen by a finger, a pointer or the like is applied.

The methods of direct input to the liquid crystal display screen include an on-cell type, in which a touch panel having a sensing function is arranged in front of a liquid crystal panel and input is accepted by the touch panel, and an in-cell type, in which the sensing function is formed in an array substrate or a counter substrate of a liquid crystal display as a sensor arranged in a matrix shape and installed inside a liquid crystal cell.

Patent Literature 1 (Jpn. Pat. Appln. KOKAI Publication No. 10-171599) discloses touch panels of the resistance film type, electromagnetic induction type, capacitance type, and optical type as technologies used for the on-cell type. However, according to the on-cell type in which a touch panel is disposed on the surface of a liquid crystal panel, the thickness and weight of the touch panel are added to those of a liquid crystal display and so causes an increase in thickness and weight. Further, due to light reflex by the surface of the touch panel and an inner surface of the touch panel, a liquid crystal display quality may deteriorate.

In contrast, the in-cell type in which a sensor is installed inside a liquid crystal cell as a liquid crystal display incurs no increase in thickness of the liquid crystal display and is unlikely to cause degradation of display quality, which makes this type preferable. The development of an optical sensor as a sensor having the sensing function is in progress.

In a liquid crystal display used for information devices, stereoscopic image display is increasingly being used and technical demands, for example, a demand to provide a sense of clicking on the display of a button to which a stereoscopic display effect is attached, error prevention during finger input and the like are increasing. For the finger input, a type in which a touch panel is externally attached to the surface of a liquid crystal display is known. An input type using an optical sensor contained in a liquid crystal panel to achieve weight reduction is under development. A liquid crystal display containing the optical sensor is subjected to the temperature and a backlight light source and may need compensation for the optical sensor.

In a silicon photodiode using polysilicon or amorphous silicon as a channel layer, a dark current may be generated by changes in the environmental temperature or the like, which adds noise that is not observed light to measured data. In a silicon photodiode having the grain boundary of a liquid crystal such as polysilicon, continuous-grain silicon or the like, positional variations of the grain boundary directly lead to variations of photodiode characteristics, which makes it difficult in some cases to form a plurality of uniform optical sensors in the screen of a liquid crystal display. When compared with this photodiode, phototransistor characteristics of an optical sensor from an oxide semiconductor described later are extremely uniform.

Patent Literature 2 (Jpn. Pat. Appln. KOKAI Publication No. 2002-335454) and Patent Literature 3 (Jpn. Pat. Appln. KOKAI Publication No. 2007-18458) disclose a technology to make operation corrections by using a photodiode that corrects a dark current. Patent Literature 2, 3 disclose a dark current correction technology by an image sensor, but do not disclose stable input when a phototransistor formed from an oxide semiconductor is applied to a display apparatus and a technology to control noise originating from reflected light. A photo-sensor formed from an oxide semiconductor does not have a large dark current accompanying a photo-sensor formed from a silicon semiconductor and there is no need to actively perform dark current correction.

Patent Literature 4 (WO 2009/116205) discloses a technology to emit a sensing dedicated light from an oblique direction to achieve stable input when a photoreceptor is used as a touch sensor. However, Patent Literature 4 does not disclose a technology to control noise originating from reflected light in a liquid crystal cell, that a photoreceptor of an oxide semiconductor having uniform characteristics with less characteristic variations among a plurality of elements is used, or realization of a more stable input technology by use of a signal-compensated photoreceptor. According to the technology of Patent Literature 4, the sensing dedicated light is always emitted in a different direction from a direction of the observer via a slit of a light shielding layer and the dedicated sensing light may enter an eye of the observer due to a chipped portion of a black matrix, irregular reflection from TFT (thin film transistor) metal wires, or diffraction of light, leading to display degradation. Further, Patent Literature 4 does not disclose that an intensity of an oblique emission light is switched depending on the purpose (purpose of image quality priority, security, or finger input) of using a liquid crystal display and the reduction of signal variations by reflected light increased due to a shade difference (luminance difference) of the image display.

In recent years, an oxide semiconductor called IGZO has received widespread attention. An oxide semiconductor whose band gap is high, i.e., 2.5 to 3.5 ev when compared with a silicon photodiode, has an extremely small dark current and so the necessity of compensation to reduce a dark current as in the above silicon photodiode is low. Further, a phototransistor in which a transparent channel layer is formed from an oxide semiconductor has uniform characteristics with less variations even if a plurality of such phototransistors with a large area is formed. Based on such a viewpoint, technological development of using an oxide semiconductor as an optical sensor is under way.

Patent Literature 5 (Jpn. Pat. Appln. KOKAI Publication No. 2010-186997) and Patent Literature 6 (Jpn. Pat. Appln. KOKAI Publication No. 2011-118888) disclose an optical sensor (photoreceptor) technology using an oxide semiconductor.

Patent Literature 5 discloses an optical sensor technology applied to a display mainly using organic matter for a luminescent layer. Patent Literature 6 relates to a display apparatus including an optical sensor for position detection, in addition to an optical sensor as an area sensor. Neither Patent Literature 5 nor Patent Literature 6 discloses a liquid crystal drive technology to emit oblique light.

SUMMARY OF INVENTION

Technical Problem

The present invention has been accomplished in view of the aforementioned circumstances and hence the object of the present invention is to provide a liquid crystal display including photoreceptors of which detection results are stabilized with high precision.

Solution to Problem

In a first aspect, a liquid crystal display includes an array substrate, a counter substrate, a liquid crystal panel, and a backlight unit. The array substrate includes a plurality of photoreceptors, a plurality of electrodes, and at least one liquid crystal driving element electrically connected to the plurality of electrodes. The counter substrate includes a black matrix corresponding to a plurality of sub-pixels or pixels and forming a plurality of pixel openings segmented in a matrix shape in a plan view and a color filter layer containing a blue filter, a green filter, and a red filter corresponding to the plurality of pixel openings. The backlight unit has a configuration in which the array substrate and the counter substrate are opposed to each other via a liquid crystal layer. The backlight unit is provided on a back side of the liquid crystal panel and contains a solid-state light-emitting device. The solid-state light-emitting device includes a first light-emitting device that emits short-wavelength light of a wavelength 360 nm to 420 nm and a second light-emitting device that emits visible light. The plurality of electrodes contain a light-guiding electrode that drives a liquid crystal contained in the liquid crystal layer to emit the short-wavelength light and a pixel electrode that drives the liquid crystal contained in the liquid crystal layer to emit the visible light. The plurality of photoreceptors is a phototransistor including a transparent channel layer containing two metallic oxides or more from gallium, indium, zinc, hafnium, tin, and yttrium and contains a first photoreceptor overlapping with the blue filter in the plan view and a second photoreceptor overlapping with the green filter, the red filter, or the black matrix in the plan view.

Advantageous Effects of Invention

In aspects of the present invention, detection results by a photoreceptor included in a liquid crystal display can be stabilized with high precision.

BRIEF DESCRIPTION OF DRAWINGS

FIG. 1 is a partial plan view showing an example of a liquid crystal display according to a first embodiment.

FIG. 2 is a partial sectional view showing an example of the liquid crystal display according to the first embodiment.

FIG. 5 is a sectional view showing an example of the liquid crystal display according to the first embodiment.

FIG. 12 is a partial plan view showing an example of a liquid crystal display according to a third embodiment.

DESCRIPTION OF EMBODIMENTS

Figure 3:
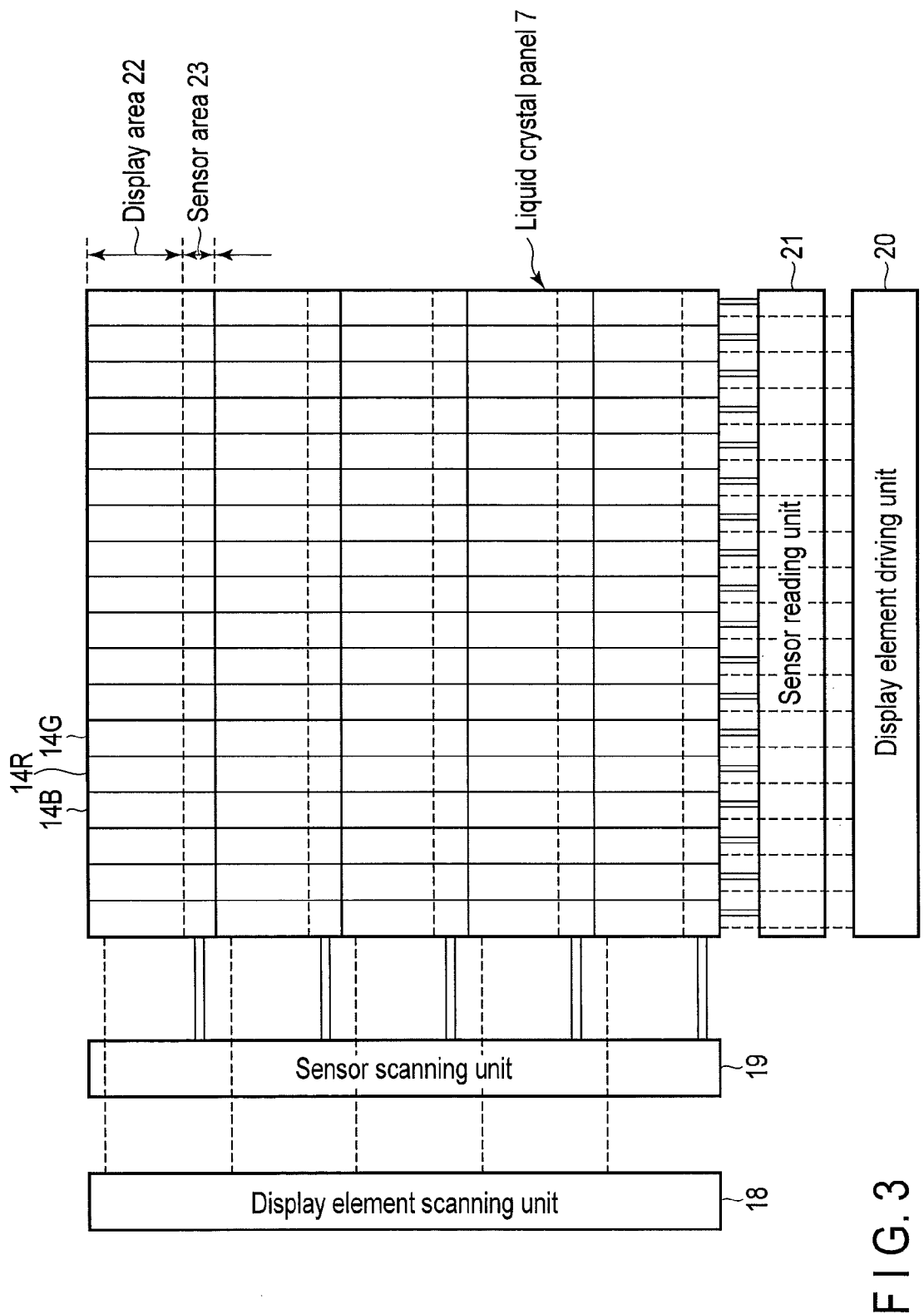
FIG. 3 is a plan view showing an example of an arrangement state of sub-pixels of the liquid crystal display according to the first embodiment.

The embodiments of the present invention will be described with reference to the drawings. In the description that follows, the same reference signs are attached to the same or substantially the same functions and elements and a description of such functions and elements is provided when necessary.

In each embodiment, only characterizing portions are described and a description of portions that are not different from elements of a normal liquid crystal display is omitted.

In each embodiment, the display unit of a single color of a liquid crystal display is assumed to be one sub-pixel or one pixel.

In each embodiment, a case in which the liquid crystal is a vertical orientation liquid crystal having negative dielectric constant anisotropy is described as a representative example, but a horizontal orientation liquid crystal having positive dielectric constant anisotropy may also be applied. The direction of rotation (direction of operation) of liquid crystal molecules when a liquid crystal driving voltage is applied may be parallel to the substrate surface or a direction rising in the vertical direction. The direction of the liquid crystal driving voltage applied to liquid crystal molecules may be horizontal, two-dimensionally or three-dimensionally oblique, or the vertical direction.

Common representative points in each embodiment are:

(A) the liquid crystal display includes, in addition to a light source that emits visible light in a visible wavelength band, a short-wavelength solid-state light-emitting device that emits illumination light of wavelengths 360 nm to 420 nm in a backlight unit, (B) emission from the short-wavelength solid-state light-emitting device is used as illumination light to illuminate an input instructor such as a finger, a pointer or the like approaching the liquid crystal screen, (C) a plurality of photoreceptors having an oxide semiconductor as a transparent channel layer are disposed in an array substrate and the distance from the liquid crystal screen, the position, the speed of movement and the like of the input instructor are detected in synchronization with emission of the short-wavelength solid-state light-emitting device, and (D) the photoreceptor is disposed at a position overlapping with a blue filter having high transmittance of short-wavelength light in the plan view.

A pixel electrode and a light-guiding electrode described in detail in each embodiment may be used as the same electrode by serving both of these functions. On the other hand, the pixel electrode to which various voltages are applied to display the gradation and the light-guiding electrode to which a specific voltage is applied to cause emission of illumination light at a specific level (or a plurality of levels) may be disposed separately in each sub-pixel or pixel. An example in which the pixel electrode and the light-guiding electrode are driven by different liquid crystal driving elements will be described in the first embodiment and an example in which the pixel electrode and the light-guiding electrode are integrally configured will be described in the second embodiment.

(First Embodiment)

In the present embodiment, the pixel electrode and the light-guiding electrode are separately driven by different liquid crystal driving elements. Driving timings of the different liquid crystal driving elements may overlap. For example, TFT can be used as the liquid crystal driving elements.

A liquid crystal driving voltage to cause emission of short-wavelength light (illumination light) as light to illuminate the input instructor is applied to the light-guiding electrode. When a photoreceptor receives and senses the short-wavelength light, the same voltage is uniformly applied to each light-guiding electrode in the whole liquid crystal display screen. However, the same voltage applied to each light-guiding electrode can be set, as will be described later, to a plurality of levels in accordance with intensity switching of emission light. Features of the light-guiding electrode are different from those of the pixel electrode to which various voltages are applied in various timings to display the gradation. In the configuration according to the second embodiment described later in which the same electrode serves as both of the light-guiding electrode and the pixel electrode, it is preferable to emit light from the short-wavelength solid-state light-emitting device that emits short-wavelength light of wavelengths 360 nm to 420 nm and from the light source of visible light of a light-emitting device (for example, a visible light solid-state light-emitting device such as an LED that emits lights of red, green, and blue) at different timings.

In the present embodiment, a liquid crystal display that includes a photoreceptor as an example of the optical sensor can obtain observed values that are highly accurate, uniform, and stable from observed values from the photoreceptor by removing noise based on reflected light inside the liquid crystal panel, and can make a three-dimensional display (stereoscopic display) or a two-dimensional display will be described.

In the present embodiment, the photoreceptor, the cell structure that emits illumination light, the light-guiding electrode and a liquid crystal operation accompanying the light-guiding electrode, and the three-dimensional display accompanying the pixel electrode will mainly be described.

FIG. 1 is a partial plan view showing an example of a liquid crystal display according to the present embodiment. FIG. 1 represents a plan view state (state viewed from the observer side) of a liquid crystal display 1 according to the present embodiment.

FIG. 2 is a partial sectional view showing an example of the liquid crystal display 1 according to the present embodiment. FIG. 2 shows an A-A' section of FIG. 1. FIG. 2 represents a section perpendicular to the major axis direction of color filters such as a blue filter 14B and pectinate or striped pixel electrodes 3a, 3b and light-guiding electrodes 3c, 3d. In FIG. 2, vertical orientation films, polarizing plates, and phase difference plates and photoreceptors 2a, 2b shown in FIG. 1 are not illustrated. As will be described later, the liquid crystal display 1 according to the present embodiment can switch between the three-dimensional display and the normal two-dimensional display.

FIG. 3 is a plan view showing an example of an arrangement state of sub-pixels of the liquid crystal display 1 according to the present embodiment.

Figure 4:
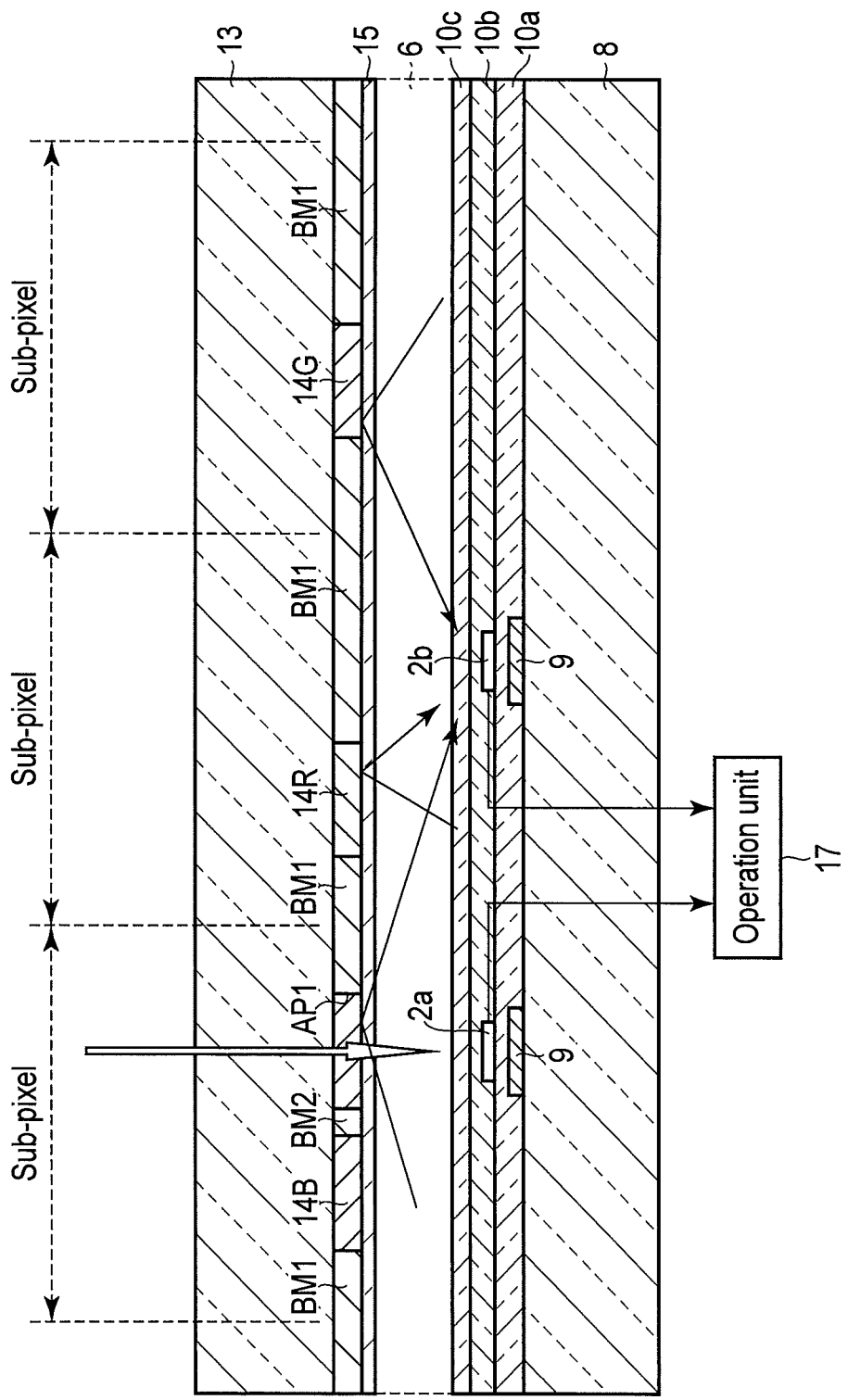
FIG. 4 is a sectional view showing an example of an arrangement of photoreceptors of the liquid crystal display according to the first embodiment.

FIG. 4 is a sectional view showing an example of the arrangement of the first photoreceptor 2a and the second photoreceptor 2b of the liquid crystal display 1 according to the present embodiment. FIG. 4 shows a B-B' section of FIG. 1 and represents a section perpendicular to the longer direction of, for example, the blue filter 14B contained in a color filter layer 14 included in the liquid crystal display 1. In FIG. 4, vertical orientation films, polarizing plates, and phase difference plates are omitted. This also applies to other sectional views below.

FIG. 5 is a sectional view showing an example of the liquid crystal display 1 according to the present embodiment.

The liquid crystal display 1 according to the present embodiment includes a liquid crystal panel 7, and an optical control element 31 and a backlight unit 30 configured to be opposite to each other via an array substrate 4, a counter substrate 5, and a liquid crystal layer 6.

The array substrate 4 includes a transparent substrate 8, a light shielding film 9, an insulating layer 10a, a plurality of the photoreceptors 2a, 2b, an insulating layer 10b, common electrodes 11a to 11d, an insulating layer 10c, the pixel electrodes 3a, 3b for image display, the light-guiding electrodes 3c, 3d for short-wavelength light control, liquid crystal driving elements 12a, 12b for image display, and a liquid crystal driving element 12c for short-wavelength light control.

Figure 6:
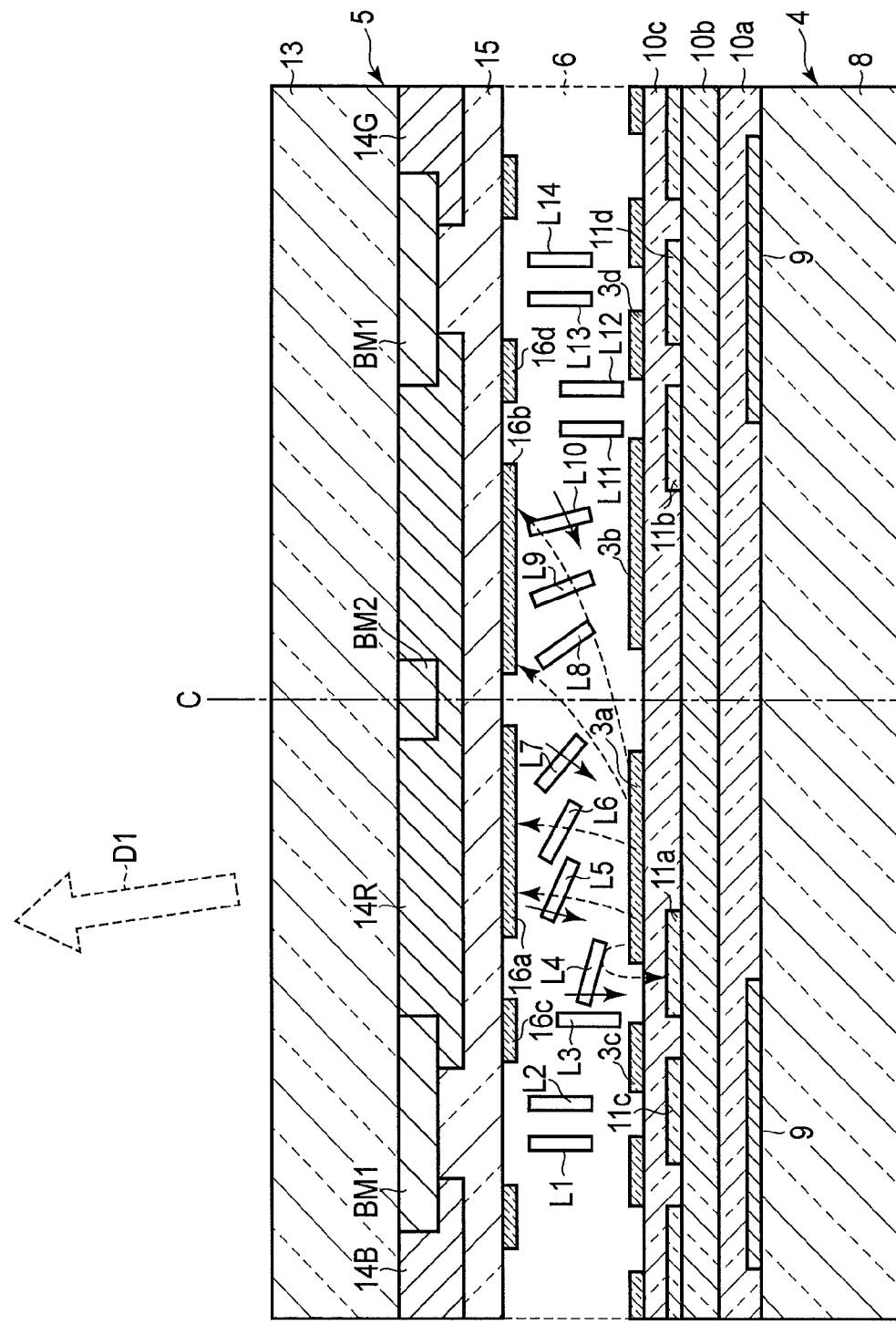
FIG. 6 is a partial sectional view showing an example of a state in which a liquid crystal driving voltage is applied to only a first pixel electrode of the liquid crystal display according to the first embodiment.

The light shielding film 9 shown in FIG. 6 is formed on one side of the transparent substrate 8 like, for example, glass.

The insulating layer 10a is formed on the transparent substrate 8 on which the light shielding film 9 is formed. The light shielding film 9 is formed from the same metal thin film as that of, for example, a gate wire or a source wire of a TFT.

The photoreceptors 2a, 2b are formed on the insulating layer 10a. The photoreceptor 2a detects light having passed through the blue filter 14 included in a pixel opening AP1 of a black matrix BM and light reflected inside the liquid crystal panel 7. The photoreceptor 2a overlaps with the pixel opening AP1 and the light shielding film 9 in the plan view and is included by being sandwiched between the pixel opening AP1 and the light shielding film 17 in a direction perpendicular to the section. The light shielding film 9 can be made a gate electrode of a transistor in a bottom gate structure described later. The sensitivity area of the photoreceptor 2a is, for example, in the wavelength region of 360 nm to 420 nm and further, the main sensitivity area is preferably in the emission peak of short-wavelength solid-state light-emitting devices 35a, 35b. If, for example, the emission peak wavelength of the short-wavelength solid-state light-emitting devices 35a, 35b is 390 nm, the photoreceptor 2a should have the peak of light-receiving sensitivity near 390 nm. For example, the blue filter 14b contained in the color filter layer 14 is formed such that the transmittance thereof is 20% or more when the wavelength is 385 nm, 30% or more when the wavelength is 390 nm, and 50% or more when the wavelength is 400 nm. The photoreceptor 2b detects light reflected inside the liquid crystal panel 7. Light detected by the photoreceptor 2b includes, for example, reflected light from various interfaces on the side of the counter substrate 5 and reflected light from the interface between the counter substrate 5 and the liquid crystal layer 6. The photoreceptor 2b overlaps with a frame portion BM1 of the black matrix BM and the light shielding film 9 in the plan view and is included by being sandwiched between the frame portion BM1 of the black matrix BM and the light shielding film 9 in a direction perpendicular to the section. The photoreceptor 2b is a photoreceptor for signal compensation.

As a transistor of the plurality of photoreceptors 2a, 2b and liquid crystal driving elements 12a to 12c, a phototransistor including a transparent channel layer containing metallic oxide of at least two of, for example, gallium (Ga), indium (In), zinc (Zn), hafnium (Hf), tin (Sn), and yttrium (Y) is usable. The transparent channel layer is made amorphous by forming the transparent channel layer from a compound of two or more oxides or three or more oxides. Accordingly, electric characteristics of each of a diode and a transistor having a compound oxide layer can be made uniform. Incidentally, the compound oxide can be crystallized by heat treatment in the range of 180° C. to 400° C. after the transparent channel layer is formed or the pattern of the transparent channel layer is formed. By crystallizing the transparent channel layer, electric characteristics of the phototransistor and transistors formed on the same substrate can further be stabilized. By providing the heat treatment to a portion of a plurality of photoreceptors by annealing using laser light, photoreceptors having different receiving characteristics can be formed.

The photoreceptors 2a, 2b are included in, for example, neighboring pixels or sub-pixels. For example, the photoreceptor 2a and the photoreceptor 2b may be connected in series to perform difference processing of signals of these two photoreceptors. For example, a transistor may be set up separately as a neighboring transistor of the photoreceptor 2a to allocate an amplifier circuit connected to the drain electrode and the source electrode of the transistor.

The insulating layer 10b is formed on the plurality of photoreceptors 2a, 2b and liquid crystal driving elements 12a to 12c.

The common electrodes 11a to 11d are formed on the insulating layer 10b.

The pixel electrodes 3a, 3b for image display and the light-guiding electrodes 3c, 3d for short-wavelength light control are formed on the insulating layer 10c.

The liquid crystal driving elements 12a, 12b for image display are electrically connected to the pixel electrodes 3a, 3b for image display.

The liquid crystal driving element 12c for short-wavelength light control is electrically connected to the light-guiding electrodes 3c, 3d for short-wavelength control.

As the liquid crystal driving elements 12a, 12b for image display and the liquid crystal driving element 12c for short-wavelength light control, for example, a TFT using an oxide semiconductor as a channel layer is used.

For the array substrate 3, the other side of the transparent substrate 8 becomes the back side of the liquid crystal panel 7 and the side on which the pixel electrodes 3a, 3b and the light-guiding electrodes 3c, 3d are formed becomes the side of the liquid crystal layer 6 via an orientation film (not shown).

The liquid crystal contained in the liquid crystal layer 6 is assumed to have, for example, an initial vertical orientation. Incidentally, the liquid crystal display 1 may be a VA liquid crystal type using the liquid crystal of initial vertical orientation or an ECB type using the liquid crystal of initial horizontal orientation. While a liquid crystal whose dielectric constant anisotropy is negative will be described as the VA liquid crystal below, a liquid crystal whose dielectric constant anisotropy is positive may also be used. A liquid crystal whose dielectric constant anisotropy is positive may be used as the VA liquid crystal.

A liquid crystal of vertical orientation is used for the liquid crystal layer 6. Thus, the orientation of the liquid crystal layer 6 is basically perpendicular to the substrate surface. Liquid crystal molecules L1 to L14 are vertically oriented to the surface of the counter substrate 5 and the array substrate 4. In the present embodiment, photo alignment and orientation treatments of a vertical orientation film (not shown) such as rubbing can be omitted by generating an oblique electric field with respect to the substrate. In the present embodiment in which an oblique electric field is used, exact pre-tilt angle control such as 89° that is needed in the conventional VA type is no longer needed and a liquid crystal of simple initial vertical orientation like, for example, 90° can be used. The pre-tilt angle means an angle between the surface of the counter substrate 5 or the array substrate 4 and the major axis of liquid crystal molecules when no liquid crystal driving voltage is applied.

In the present embodiment, a liquid crystal material containing fluorine atoms in the molecular structure (hereinafter, called a fluoric liquid crystal) can be used as a material of liquid crystal. The fluoric liquid crystal has a low dielectric constant and thus, incorporation of ionic impurities can be decreased, performance degradation such as a lower voltage retention due to impurities can be prevented, and an occurrence of display unevenness can be controlled.

When the position of polarizing plates (not shown in FIG. 2) is crossed-Nicols, the liquid crystal panel is a normally-black. Alternatively, when optical axes of two polarizing plates are made parallel to each other and the liquid crystal panel is a normally-white, emission light from a short-wavelength solid-state light-emitting device described later can be caused to be emitted from the liquid crystal panel surface even when no liquid crystal driving voltage is applied, which makes the light easier to utilize as illumination light of a finger, a pointer or the like.

The counter substrate 5 includes a transparent substrate 13, the black matrix BM, the color filter layer 14, a transparent resin layer (protective layer) 15, and counter electrodes 16a to 16d as common electrodes. The blue filter 4B, a red filter 14R, and a green filter 14G segmented by the black matrix BM are formed on the surface of one side of the transparent substrate 13. The transparent resin layer 15 is provided on the color filter layer 14 containing the blue filter 14B, the red filter 14R, and the green filter 14G. The counter electrodes 16a to 16d are formed on the transparent resin layer 15. For the counter substrate 2, the other side (upper side of the transparent substrate 22 in the illustration) of the transparent substrate 13 becomes the observer side and the side of the counter electrodes 16a to 16d becomes the side of the liquid crystal layer 6 via an orientation film (not shown).

The black matrix BM corresponds to a plurality of pixels or sub-pixels and is formed on one side of the transparent substrate 13 such that a plurality of pixel openings AP1 segmented in a matrix shape in the plan view is formed. In the present embodiment, the black matrix BM is formed in pixel or sub-pixel units and includes two parallel long side portions of the frame portion BM1 forming the pixel opening AP1 and a center portion BM2 dividing the pixel opening AP1 into two portions. The center portion BM2 may be omitted.

In the present embodiment, the counter electrodes 16a to 16d of the counter substrate 13 shown in the section of FIG. 2 are arranged symmetrically with respect to a center axis C of a sub-pixel.

In the present embodiment, the pixel electrodes 3a, 3b, the light-guiding electrodes 3c, 3d, and the common electrodes 11a to 11d of the array substrate 4 shown in the section of FIG. 2 are arranged symmetrically with respect to the center axis C of the sub-pixel.

An operation unit 17 calculates a value obtained by subtracting an observed value of the photoreceptor 2b from an observed value of the photoreceptor 2a as a compensated observed value (actual measurement compensation value). In other words, a corrected observed value of the photoreceptor 2a is determined by subtracting an observed value of the photoreceptor 2b from an observed value of the photoreceptor 2a.

In the present embodiment, a sub-pixel includes the two or more liquid crystal driving elements 12a to 12c and the pixel electrode 3a, the pixel electrode 3b, and the light-guiding electrodes 3c, 3d corresponding to each of the two or more liquid crystal driving elements 12a to 12c. More specifically, the liquid crystal driving elements 12a, 12b are electrically connected to the pixel electrodes 3a, 3b that drive the liquid crystals L3 to L12 below the pixel opening AP1 to exercise transmission control of visible light for image display to be provided to the observer in the sectional view. The liquid crystal driving element 12c is electrically connected to the light-guiding electrodes 3c, 3d that drive the liquid crystals L1, L2, L13, L14 in the sectional view. The light-guiding electrodes 3c, 3d are driven by the common liquid crystal driving element 12c in the present embodiment, but the light-guiding electrodes 3c, 3d may be driven by separate liquid crystal driving elements.

In FIG. 3, a display element scanning unit 18, a sensor scanning unit 19, a display element driving unit 20, and a sensor reading unit 21 are electrically connected to the liquid crystal panel 7. The backlight unit 30 including a light source is provided on the back side of the liquid crystal panel 7, but is omitted in FIG. 3. Solid-state light-emitting devices 32a, 32b, 35a, 35b like, for example, an LED of the backlight unit 30 are arranged in an edge portion on both sides of the liquid crystal panel 7. As will be described in detail in an embodiment described below, for example, a light-emitting device sequence of the visible region such as red, green, and blue may be arranged on both ends of the backlight unit as an installation form of solid-state light-emitting devices and further, a short-wavelength solid-state light-emitting device sequence may similarly be arranged on both ends of the backlight unit. Short-wavelength solid-state light-emitting devices may be arranged in two rows by using solid-state light-emitting devices of different wavelengths. Solid-state light-emitting devices of such a backlight may be arranged, in addition to ends of both side portions of the liquid crystal panel 7, on an end of the upper side of the liquid crystal panel 7 and on an end of the lower side of the liquid crystal panel 7. Solid-state light-emitting devices of visible light arranged on four sides of the liquid crystal panel 7 may be matched to display content by the local dimming method to adjust an emission intensity of each. Accordingly, the contrast of liquid crystal display can be improved.

The timing of light emission and emission intensity of the solid-state light-emitting devices 32a, 32b of visible light are adjusted by conforming to images of the two-dimensional image display or three-dimensional image display or the local dimming method as described above. Accordingly, the liquid crystal display screen is in a state in which different display portions are different in brightness and color depending on display content. The intensity of visible light emitted from such a liquid crystal display screen varies greatly in accordance with the display portion, gradation display level, and display timing. Therefore, it is preferable to avoid using visible light emitted from the liquid crystal display screen as illumination light of the input instructor such as a finger, a pointer or the like. When the input instructor is detected by using visible light that varies greatly, it may be difficult to accurately detect the two-dimensional position of the input instructor, height from the display surface, and moving speed. Also, when ambient light (outside light) of the liquid crystal display is used to detect the input instructor, the ambient light varies greatly and it is difficult in some cases to detect the input instructor with high precision.

Thus, in the present embodiment, the backlight unit 30 includes the solid-state light-emitting devices 35a, 35b of short-wavelength light, in addition to the solid-state light-emitting devices 32a, 32b of visible light, and reflected light of short-wavelength light from the input instructor is detected by the photoreceptor 2a capable of detecting short-wavelength light. Further, in the present embodiment, a synchronization control unit 36 makes emission timing 32a, 32b of the solid light-emitting devices of visible light and emission timing of the solid-state light-emitting devices 35a, 35b of short-wavelength light different and synchronizes the emission timing of the solid-state light-emitting devices 35a, 35b of short wavelengths with a timing to receive light by the photoreceptor 2a to achieve more accurate detection of the input instructor.

The wavelength of short-wavelength light applied in the present embodiment is assumed to be in the range of, for example, 360 nm to 420 nm.

The transmittance peak of the blue filter 14B is in the range of about 430 nm to 460 nm and thus, in the present embodiment, the emission peak of the solid-state light-emitting devices 35a, 35b of short wavelengths is assumed to be 420 nm or less, which is shorter than 430 nm. The upper limit of short-wavelength light applied in the present embodiment is set to 420 nm in consideration of the facts that the visibility of the human eye decreases rapidly in the region of wavelengths shorter than 420 nm, which makes visual recognition difficult, and a conversion efficiency of a phototransistor in which a transparent channel layer is formed from an oxide semiconductor (described in detail later) rises when the wavelength is shorter than 420 nm.

As a blue material of the blue filter 14B, for example, a color material in which a blue pigment of C. I. Pigment Blue 15:6 and a violet pigment of C. I. Pigment Violet 23 as organic pigments are mixed is used. The blue filter 14B using these pigments allows light to pass through in the wavelength range of 360 nm to 420 nm, but hardly allows short-wavelength light of 360 nm or less to pass through. In addition, the polarizing plate and organic films such as low-reflection films used by being affixed to the front or back side of the liquid crystal panel 7 have properties to cut or absorb ultraviolet rays having short wavelengths of 360 nm or less. The solid-state light-emitting devices 35a, 35b have high luminous efficiency on the wavelength side longer than 360 nm, which can reduce power consumption of the liquid crystal display 1. In consideration of the above characteristics, the lower limit of the wavelength of light applied in the present embodiment is set to 360 nm.

As the solid-state light-emitting devices 35a, 35b of short wavelengths according to the present embodiment, an aluminum nitride-gallium light-emitting diode, a diamond light-emitting diode, a zinc oxide light-emitting diode, or a gallium nitride light-emitting diode is used. Among gallium nitride light-emitting diodes (called GaN blue light-emitting diodes), an InGaN light-emitting diode in which indium is added to an active layer of the light-emitting diode as a dopant is preferable. By adjusting the composition of In, the emission peak can be adjusted in the range of 360 nm to 420 nm. For example, an InGaN light-emitting diode whose emission peak is 385 nm is a small chip that can be surface-mounted and is sold on the market.

As the photoreceptors 2, 2b according to the present embodiment, for example, a phototransistor including a transparent channel layer containing two metallic oxides or more from, as described above, gallium (Ga), indium (In), zinc (Zn), hafnium (Hf), tin (Sn), and yttrium (Y) can be used. By forming an impurity level in the transparent channel layer of these compound metallic oxides as oxide semiconductors, the band gap thereof is made smaller and the sensitivity area of the photoreceptors 2, 2b can be shifted to the visible region on the longer wavelength side. Also, by forming the transparent channel layer from a compound of two or more oxides or three or more oxides, the transparent channel layer can be made amorphous and electric characteristics of a diode or transistor including the transparent channel layer can be made uniform.

The blue sub-pixel, red sub-pixel, and green sub-pixel shown in FIG. 1 includes a display area 22 and a sensor area 23. The sub-pixel is the minimum display unit in the present embodiment, but the pixel may be set as the minimum display unit. For example, the pixel may include at least one red sub-pixel, at least one blue sub-pixel, and at least one green sub-pixel.

In the partial plan view in FIG. 1 and the partial sectional view in FIG. 4, the photoreceptors 2a, 2b are shown. The photoreceptors 2a, 2b are provided in the sensor area 23. The sensor area 23 includes, for example, a transistor or diode that performs signal processing of the photoreceptors 2a, 2b, a capacitor that stores received data, the operation unit 17 that performs operation processing, and a signal line that delivers a reset signal to the photoreceptors 2a, 2b. A plurality of transistors that perform signal processing may be provided in the sensor area of one pixel including a blue sub-pixel, a red sub-pixel, and a green sub-pixel. By applying a transistor or diode that performs signal processing to an output value of the photoreceptors 2a, 2b, processing of an earlier output value is enabled and a high-speed input operation by the input instructor can be performed. The liquid crystal driving elements 12a to 12c may be formed in the display area 22 or the sensor area 23. The liquid crystal driving elements 12a to 12c are electrically connected to metal thin wires such as gate lines and source lines (not shown).

As shown in FIG. 4, the blue filter 14B is arranged above the photoreceptor 2a and the light shielding film 9 is arranged below the photoreceptor 2a. The black matrix BM is arranged above the photoreceptor 2b and the light shielding film 9 is arranged below the photoreceptor 2b. By arranging the photoreceptor 2b between the black matrix BM as a light shielding pattern and the light shielding film 9, the entry of light into the photoreceptor 2b from the normal direction on the front side of the liquid crystal display 1 and the direct entry of light into the photoreceptor 2b from the backlight unit 30 positioned on the back side of the liquid crystal panel 7 are prevented. The photoreceptor 2b is used to remove reflection noise generated inside the liquid crystal cell to obtain a correct received light value. The photoreceptor 2b is used for signal compensation. The light shielding film 9 may be formed from the same material as that of agate electrode in the same process. In FIG. 4, illustration of a source electrode and a drain electrode included in each of the photoreceptors 2a, 2b is omitted.

Display content of the liquid crystal display 1 has a difference arising between screen regions such as a bright display and a dark display. Light from the backlight unit 30 is partially reflected by various interfaces such as the color filter 14 of the counter substrate 5, one surface of the transparent substrate 13, and polarization films and enters the photoreceptors 2a, 2b as reflected light. The reflected light causes noise of intensity of received light. This also applies when an optical input device such as a light pen, laser light or the like is used as the input instructor and re-reflected light causes noise.

To remove noise based on such reflected light or re-reflected light to obtain a highly accurate observed value, the operation unit 18 subtracts an observed value of the photoreceptor 2b from an observed value (light receiving intensity) of the photoreceptor 2a. Noise compensation is thereby realized. The signal compensation can also compensate for noise generated based on small variations of observed values of the photoreceptors 2a, 2b having an oxide semiconductor for a transparent channel layer, a dark current, or the temperature so that an extremely accurate observed value can be obtained. The compensation based on the subtraction of an observed value of the photoreceptor 2b from an observed value (light receiving intensity) of the photoreceptor 2a can provide an advantage such that the intensity of ultraviolet rays contained in ambient light components of the sun and the like can be measured. Measured values of intensity of ultraviolet rays of ambient light components can be put to use to prevent, for example, sunburn.

Performing a compensation operation between photoreceptors having a difference in display portions thereof of the screen such as a bright display and a dark display may not be preferable because the amount of noise due to reflected light or re-reflected light is significantly different. This also applies when an optical input device such as a light pen, laser light or the like is used as the input instructor and the level of noise is significantly different between a photoreceptor in a portion irradiated with light and a photoreceptor in a portion not irradiated with light. Therefore, in the present embodiment, the compensation operation is performed by the subtraction of observed values of the neighboring photoreceptors 2a, 2b.

A switching unit 24 switches the intensity of emitted short-wavelength light by a technique of, for example, changing the height of the voltage applied to the light-guiding electrodes 11c, 11d.

If the compensated observed value determined by the operation unit 17 indicates that an input instructor is approaching the liquid crystal display screen, the switching unit 24 can apply a high voltage to the light-guiding electrodes 11c, 11d via the liquid crystal driving element 12c to automatically increase the intensity of short-wavelength light emission. By increasing the intensity of short-wavelength light emission, it becomes possible to recognize the input instructor even if the distance from the liquid crystal display screen to the input instructor is, for example, 7 mm, which makes input providing a sense of clicking with a 3D button display on the liquid crystal screen easier to achieve. For the recognition of the input instructor, for example, sections of different sizes of two levels or a plurality of levels dividing compensated observed values after the compensation operation by the operation unit 17 are set and the number of compensated observed values (for example, corresponding to the area of the finger on the liquid crystal screen) belonging to each section or the speed of change of the number of compensated observed values belonging to each section and their positions are detected. Through the detection, an approximate distance between the liquid crystal display screen and the input instructor and movement thereof can be recognized.

For example, the switching unit 24 of the liquid crystal display 1 may include an instruction receiving unit or the liquid crystal display 1 may display a switching request receiving unit on the screen to receive switching instructions. The switching unit 24 switches the intensity of short-wavelength light emission in accordance with input switching instructions. For example, the switching unit 24 realizes the mode specified by the user from "Display priority mode" that does not emit short-wavelength light, "Finger operation mode" to do finger input by emitting short-wavelength light, and "Security mode" to prevent visual recognition by third parties. When "Finger operation mode" is selected, the switching unit 24 causes emission of short-wavelength light of high intensity. The intensity of emitted short-wavelength light is controlled based on, as described above, the liquid crystal driving voltage applied to the light-guiding electrodes 3c, 3d. "Security mode" is used in the third embodiment with a slit opening described later.

In the example of the B-B' section in FIG. 4, the counter electrodes 16a to 16d as transparent conductive films are stacked on the surface of the transparent resin layer 15 in contact with the liquid crystal layer 6 on the side of the counter substrate 5. For example, a transparent conductive film (ITO) is commonly formed by using a mixed oxide of indium and tin. While the refractive index of the color filter layer 14, the transparent resin layer 15, the transparent substrate 13 and the like as members on the side of the counter substrate 5 is in the range of about 1.5 to 1.6, the transparent conductive film has a high refractive index of 1.8 to 1.9. Thus, if transparent conductive films such as the counter electrodes 16a to 16d are stacked on the transparent resin layer 15 of the counter substrate 5, the amount of observed values of reflected light from the transparent conductive films added to observed values of the photoreceptors 2a, 2b increases. In the present embodiment, however, transparent conductive films are not formed at the position of the counter substrate 5 opposite to the photoreceptors 2a, 2b and thus, noise due to reflected light can be reduced. Transparent conductive films using a material of high refractive index as in the present embodiment are preferably formed as required in a portion of the display area 22 because of the amount of surface reflection thereof.

FIG. 5 is a sectional view showing an example of the liquid crystal display 1 according to the present embodiment. In FIG. 5, the physical relationship of the liquid crystal panel 7, the optical control element 31, and the backlight unit 30 included in the liquid crystal display 1 is illustrated.

The backlight unit 30 includes a sequence of the solid-state light-emitting devices 32a, 32b, 35a, 35b such as LEDs on both sides of the back side of the liquid crystal panel 7 or on the back side of the liquid crystal panel 7. The solid-state light-emitting devices are configured as a LED array in which a plurality of the short-wavelength solid-state light-emitting devices 35a, 35b and a plurality of the visible light solid-state light-emitting devices 32a, 32b are arranged.

The optical control element 31 is arranged between the back side of the liquid crystal panel 7 and the backlight unit 30 to make the optical control element 31 less likely to be observed by the observer (user) and to prevent recognition by third parties and polarizes the emitted light. The optical control element 31 is generated by using, for example, methacrylate resin. The optical control element 31 has a configuration in which a prism sheet 33 and a lens sheet 34 are integrated in a back-to-back state. In other words, the optical control element 31 is a resin sheet integrating the prism sheet 33 and the lens sheet 34 with back sides thereof put together.

The prism sheet 33 is formed by arranging a plurality of prisms in a triangular prism shape such that the longer directions (the direction of long lengths, ridge line direction, or axial direction) of the prisms in a triangular prism shape are parallel to each other and sectional triangles are oriented in the same direction.

The lens sheet 34 is formed by arranging a plurality of lenses in a semicircular columnar shape such that the longer directions of the side of the lenses in a semicircular columnar shape are parallel to each other and sectional semicircular arcs are oriented in the same direction.

By providing an angle θ1 between the longer direction of the lens in a semicircular columnar shape or the prism in a triangular prism shape and the liquid crystal display 1, moire in the three-dimensional display can be reduced. The more moire is mitigated the closer θ1 is to 45°. However, when θ1 is 45°, interference with the polarizing plate or the optical axis of a phase difference may occur and thus, it is preferable to set θ1 to an angle smaller than 45°. If an alignment error (±2°) of the polarizing plate and the liquid crystal panel 7 is considered, the maximum value of the angle θ1 is preferably set to 43° or less. If θ1 is close to zero, large moire at low frequency becomes more conspicuous in the three-dimensional image display and is likely to be recognized as shade or color unevenness. To mitigate moire, therefore, the angle θ1 between the longer direction of the prism in a triangular prism shape and the pixel arrangement of the liquid crystal display 1 is preferably set to an angle larger than 3°.

The emission angle (light distribution angle) of light with respect to the normal direction of the liquid crystal panel 7 can be set by the angle of the tip of a prism in a triangular prism shape whose sectional shape is an isosceles triangle. Incidentally, as the optical control element 31, two prism sheets or more with different angles θ1 may be used.

For example, by synchronizing the visible light solid-state light-emitting devices 32a, 32b of the backlight unit 30 with a liquid crystal operation of the liquid crystal display 1 to alternately cause emission, the three-dimensional image display can be realized.

For example, the synchronization control unit 36 realizes recognition of the input instructor by synchronizing the short-wavelength solid-state light-emitting devices 35a, 35b of the backlight unit 30 with the photoreceptors 2a, 2b and the light-guiding electrodes 3c, 3d of the liquid crystal display 1 to cause emission.

The backlight unit 30 may further include a diffuser panel, a light-guiding plate, a polarization separating film, a retroreflective polarizing element and the like. A polarizing plate, a phase difference plate and the like may be affixed to the front or back side of the liquid crystal panel 7.

The backlight unit 30 may include, for example, a plurality of white LEDs including three wavelengths of red, green, and blue in the emission wavelength region as the plurality of visible light solid-state light-emitting devices 32a, 32b. As the visible light solid-state light-emitting devices 32a, 32b, a pseudo-white LED combining a GaN blue LED and a YAG fluorescent material may be used. When the pseudo-white LED is used, LEDs having a main peak of one color or more such as a red LED may be combined and used to enhance color rendering. As the visible light solid-state light-emitting devices 32a, 32b, for example, a light source combining a blue LED with red/green phosphors may be used.

The color display can be realized without using the color filter layer 14 by using solid-state light-emitting devices individually emitting light of red, green, or blue as light sources and causing field sequential (time division) light emission in synchronization with liquid crystal driving.

The synchronization control unit 36 causes the visible light solid-state light-emitting devices 32a, 32b arranged on both ends of the backlight unit 30 to alternately produce emission in synchronization with the liquid crystal display to allow light to enter the right eye and the left eye of the observer. Accordingly, three-dimensional image display is realized.

A bright two-dimensional image display with a wide viewing angle can be made by simultaneously applying a liquid crystal driving voltage to the pixel electrodes 3a, 3b of the liquid crystal display 1 and causing the visible light solid-state light-emitting devices 32a, 32b to simultaneously emit light. In the present embodiment, the three-dimensional image display and the two-dimensional image display can be switched. In the present embodiment, a high-quality three-dimensional image display can advantageously be created using the two-dimensional image display without losses of resolution of the three-dimensional image display.

In the present embodiment, the observer observing the display screen can be made less subject to short-wavelength light. By using the optical control element 31 according to the present embodiment, a high-quality three-dimensional image display can be realized.

Hereinafter, liquid crystal driving by the counter substrate 5 and the array substrate 4 and light emitted by the liquid crystal driving will be described using FIGS. 6 to 8.

FIG. 6 is a partial sectional view showing an example of a state in which a liquid crystal driving voltage is applied to only the first pixel electrode 3a of the liquid crystal display 1 according to the present embodiment.

The liquid crystal molecules L1 to L14 of the liquid crystal display 1 have negative dielectric constant anisotropy. The major axis direction of the liquid crystal molecules L1 to L14 is vertical before a driving voltage is applied, but when a voltage is applied to the pixel electrode 3a by the liquid crystal driving element 12a, some of the liquid crystal molecules L1 to L14 (the liquid crystal molecules L4 to L10 in FIG. 6) are inclined. FIG. 6 shows an example of a driving state of the liquid crystals when a driving voltage is applied to only the pixel electrode 3a.

The liquid crystal molecules L4 to L9 fall in a direction perpendicular to an electric line of force. Emission light D1 is emitted, for example, in the direction of one eye (for example, the right eye) of the observer by passing through an inclined portion of the liquid crystal. The liquid crystal molecule L4 starts to fall earlier than other liquid crystal molecules due to a strong electric field formed between an end of the pixel electrode 3a and the common electrode 11a. The operation of the liquid crystal molecule L4 serves as a trigger of the liquid crystal operation and enhances responsiveness of the liquid crystal.

Figure 7:
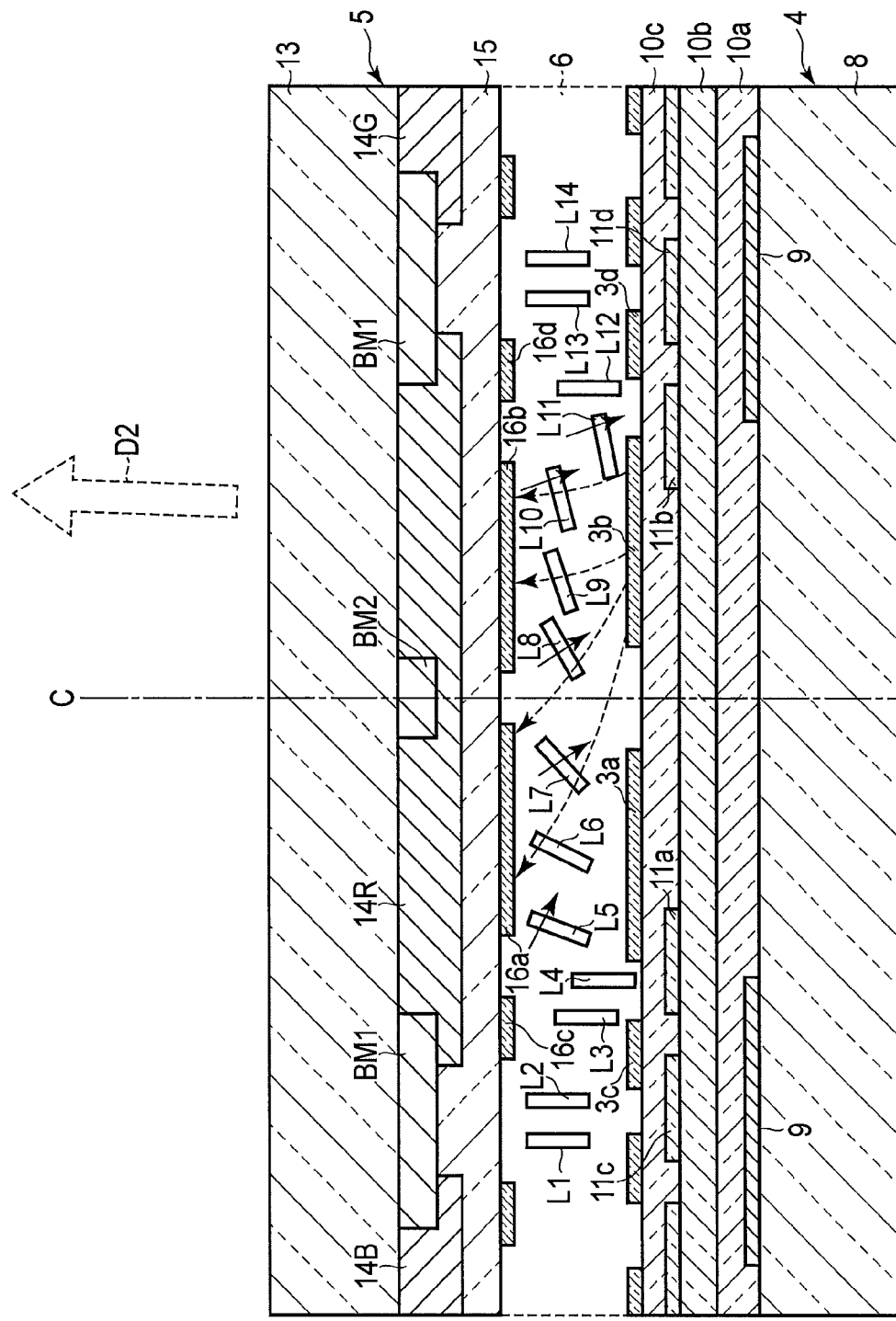
FIG. 7 is a partial sectional view showing an example of the state in which the liquid crystal driving voltage is applied to only a second pixel electrode of the liquid crystal display according to the first embodiment.

FIG. 7 is a partial sectional view showing an example of the state in which the liquid crystal driving voltage is applied to only the second pixel electrode 3b of the liquid crystal display 1 according to the present embodiment.

When a liquid crystal driving voltage is applied to the pixel electrode 3b by the liquid crystal driving element 12b, some of the liquid crystal molecules L1 to L14 (the liquid crystal molecules L5 to L11 in FIG. 7) fall in a direction perpendicular to the electric line of force. Emission light D2 is emitted, for example, in the direction of the other eye (for example, the left eye) of the observer by passing through an inclined portion of the liquid crystal. The liquid crystal molecule L11 starts to fall earlier than other liquid crystal molecules due to a strong electric field formed between an end of the pixel electrode 3b and the common electrode 11b. The operation of the liquid crystal molecule L11 serves as a trigger of the liquid crystal operation and enhances responsiveness of the liquid crystal.

FIGS. 6 and 7 show the operations of the pixel electrodes and liquid crystal molecules to switch the emission light between the right eye and the left eye needed for the three-dimensional image display. For the two-dimensional image display, the pixel electrodes 3a, 3b may be driven simultaneously. In a liquid crystal display used only for the two-dimensional image display, one liquid crystal driving element may electrically be connected to the pixel electrodes 3a, 3b, instead of the two liquid crystal driving elements 12a, 12b.

Figure 8:
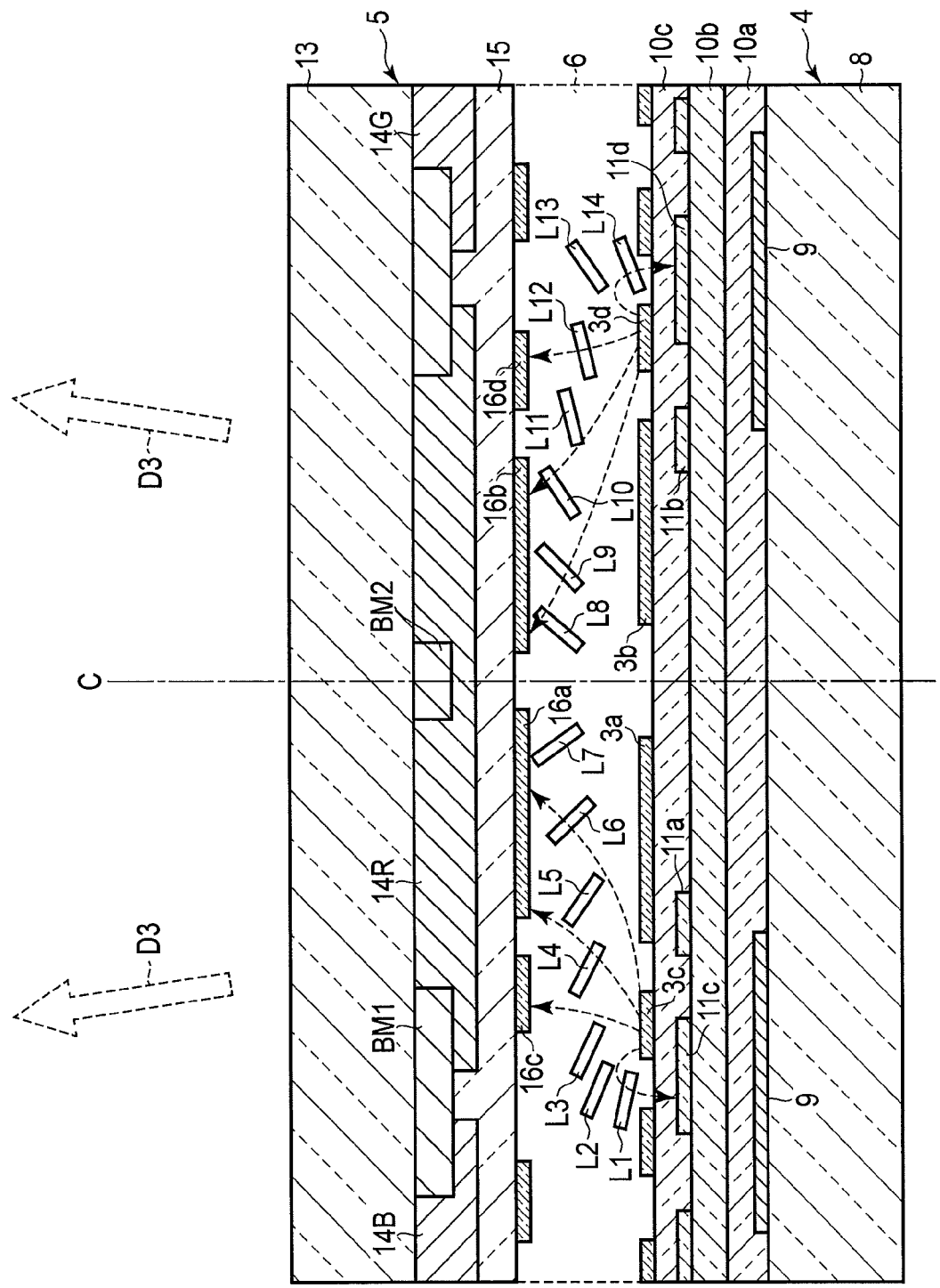
FIG. 8 is a partial sectional view showing an example of the state in which the liquid crystal driving voltage is applied to light-guiding electrodes of the liquid crystal display according to the first embodiment.

FIG. 8 is a partial sectional view showing an example of the state in which the liquid crystal driving voltage is applied to the light-guiding electrodes 3c, 3d of the liquid crystal display 1 according to the present embodiment.

When a liquid crystal driving voltage is applied to the light-guiding electrodes 3c, 3d, the liquid crystal molecules L1 to L14 fall in a direction perpendicular to the electric line of force. Short-wavelength light D3 is emitted to the outside after passing through the color filter layer 14 and a polarizing plate (not shown). The short-wavelength light D3 emitted from the short-wavelength solid-state light-emitting devices 35a, 35b illuminates the input instructor such as a finger and reflected light thereof is received by the photoreceptors 2a, 2b. Then, high-precision recognition and a stable input operation are realized by determining a compensated observed value by subtracting an observed value of the photoreceptor 2b from an observed value of the photoreceptor 2a. Stable finger recognition can be performed during a finger operation on the liquid crystal display screen by sensing a timing of the photoreceptors 2a, 2b and emission timing of the short-wavelength solid-state light-emitting devices 35a, 35b being synchronized by the synchronization control unit 36. The synchronization control unit 36 applies a liquid crystal driving voltage to the light-guiding electrodes 3c, 3d at the same timing as the sensing timing of the photoreceptors 2a, 2b and the short-wavelength light D3 is thereby emitted from the liquid crystal screen.

In the present embodiment described above, a compensated observed value that is highly accurate, uniform, and stable can be obtained by removing noise based on reflected light inside the liquid crystal panel 7 from an observed value of the photoreceptor 2a and recognition of an operation by the input instructor can be performed with high precision. In the present embodiment, the three-dimensional image display or the two-dimensional image display can be made. In the present embodiment, visual sensitivity of short-wavelength light illuminating the input instructor can be lowered by using the short-wavelength light and the observer can observe visible light for image display.

In the present embodiment, the pixel electrode 3a, the pixel electrode 3b, and the light-guiding electrodes 3c, 3d are formed separately and are each driven by the different liquid crystal driving elements 12a, 12b and the liquid crystal driving element 12c. In the present embodiment, the pixel electrode 3a, the pixel electrode 3b, and the light-guiding electrodes 3c, 3d can electrically be made independent and different voltages can be applied thereto and the timing to apply a driving voltage to the pixel electrodes 3a, 3b and the timing to apply a driving voltage to the light-guiding electrodes 3c, 3d to sense the photoreceptor 2a, 2b may overlap. In the present embodiment, a transistor (oxide semiconductor TFT) including a transparent channel layer containing metallic oxide is used as a liquid crystal driving element and the oxide semiconductor TFT can be formed smaller than a transistor using amorphous silicon and polysilicon. By using a smaller transistor, the aperture ratio of pixels is improved to be able to make a brighter stereoscopic image display. Even if no color filter is used, a color stereoscopic image display can be made by including light-emitting device sequences individually emitting light of red, green, or blue in the backlight unit and causing field sequential (time division) light emission in synchronization with liquid crystal driving.

A control unit to adjust the angle of mission light from the light-emitting device sequences that emit visible light based on an operation to adjust the effect of three-dimensional image display by the observer (user) may be included. The control unit optimizes the effect of three-dimensional image display by adjusting the angle θ of emission light from the liquid crystal display surface in accordance with the observer's position or the spacing width between both eyes of the observer. The adjustment of the angle θ of emission light may be such that a liquid crystal display proposed by the present inventors includes an infrared-emitting device and an infrared sensor in a portion of, for example, the housing to detect the position of the observer and adjusts the angle of emission light from the light-emitting device sequences based on the position information. It is particularly preferable to cause the control unit to recognize the position of the observer's eyes by using an imaging device such as CCD or CMOS, instead of the infrared-emitting device and the infrared sensor. In addition, the control unit can be caused to recognize the observer's operation by using an imaging device such as a CCD or CMOS to reflect the observer's operation in the liquid crystal display.

An optical control element used in the first embodiment and a liquid crystal display including the optical control element may include the following characteristics.

The liquid crystal display includes a liquid crystal panel and a backlight unit. The liquid crystal panel includes a plurality of pixels and a liquid crystal is driven by a plurality of liquid crystal driving elements. The backlight unit includes a plurality of light-emitting device sequences that emit light at different timings. In the liquid crystal display, light emitted from the light-emitting device sequences passes through the liquid crystal panel via the optical control element. The optical control element is an integrated resin sheet including a first plane in which a plurality of prisms in a triangular prism shape is arranged such that the longer directions of the prisms in a triangular prism shape are parallel to each other and a second plane in which a plurality of lenses in a semicircular columnar shape is arranged in a back-to-back state to the plurality of prisms in a triangular prism shape and such that the longer directions of the side of the lenses in a semicircular columnar shape are parallel to each other. The longer direction of the plurality of prisms in a triangular prism shape and the longer direction of the plurality of lenses in a semicircular columnar shape form a moire suppression angle θ in the plan view.

The plurality of liquid crystal driving elements may be a transistor including a transparent channel layer containing two metallic oxides or more selected from gallium, indium, zinc, hafnium, tin, and yttrium.

The liquid crystal panel may include a color filter in which a red filter, a green filter, and a blue filter are contained in each pixel. The light-emitting device sequences may include two light-emitting device sequences that emit white light containing three wavelengths of red, green, and blue. The two light-emitting device sequences may be provided at positions corresponding to two sides opposite to each other of the liquid crystal panel to emit white light in a direction perpendicular to the longer direction of the plurality of prisms in a triangular prism shape.

The liquid crystal panel is configured based on a matrix array of a plurality of pixels and the longitudinal direction of the matrix array of the plurality of pixels and the longer direction of the plurality of prisms in a triangular prism shape may form the moire suppression angle θ in the plan view.

The moire suppression angle θ may be any angle in the range of 3° to 43°.

The liquid crystal display may further include a control unit to adjust the angle of emission light from the plurality of light-emitting device sequences.

(Second Embodiment)

In the present embodiment, a liquid crystal display in which a liquid crystal driving element is allocated to a pixel electrode configured by integrating a pixel electrode and a light-guiding electrode will be described.

Figure 9:
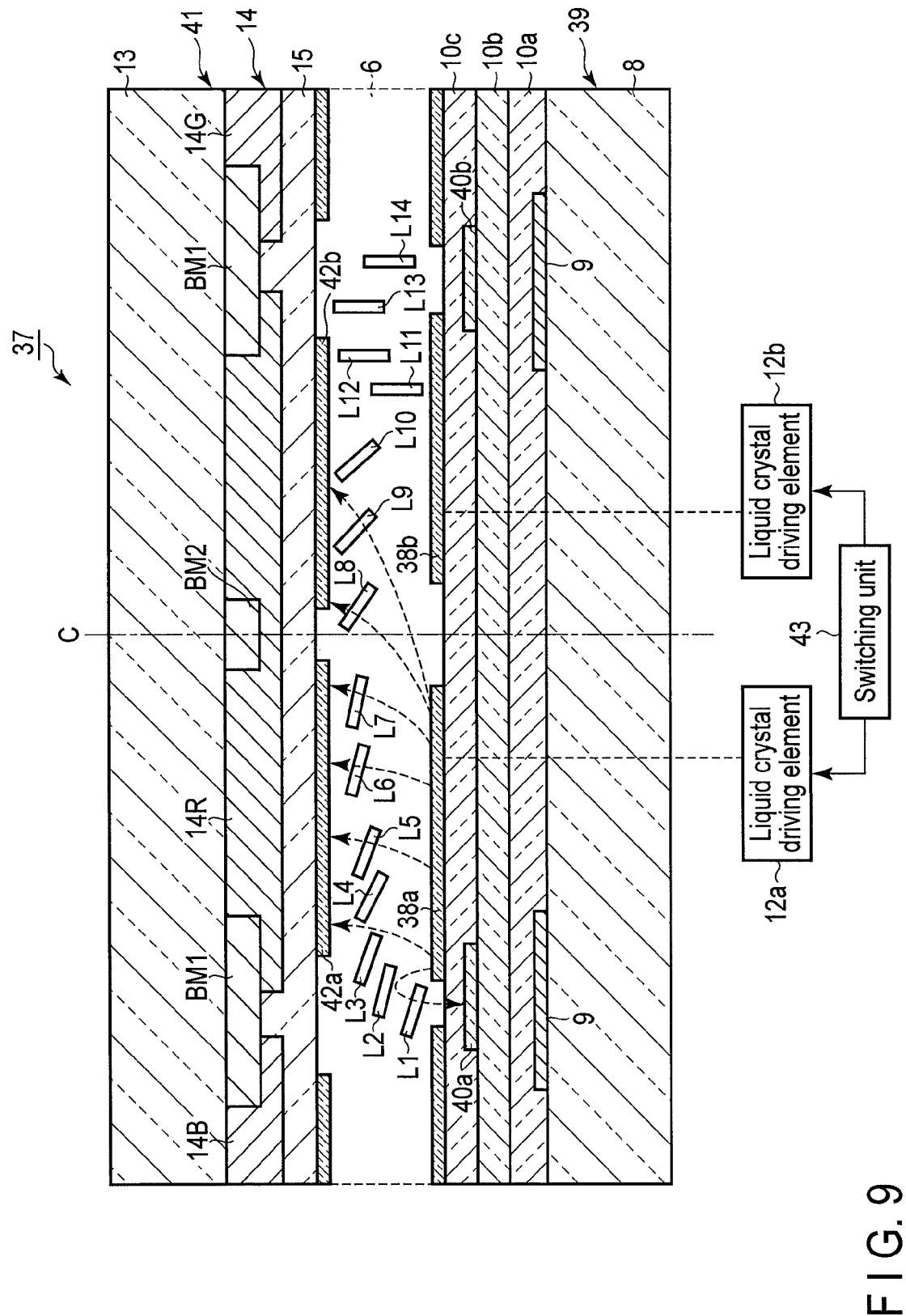
FIG. 9 is a partial sectional view showing an example of the state in which the liquid crystal driving voltage is applied to only a first pixel electrode of a liquid crystal display according to a second embodiment.

FIG. 9 is a partial sectional view showing an example of the state in which the liquid crystal driving voltage is applied to only a first pixel electrode 38a of a liquid crystal display 37 according to the present embodiment.

An array substrate 39 of the liquid crystal display 37 includes the pixel electrode 38a configured by integrating a pixel electrode 3a and a light-guiding electrode 3c in the first embodiment and a pixel electrode 38b configured by integrating a pixel electrode 3b and a light-guiding electrode 3d in the first embodiment.

The array substrate 39 of the liquid crystal display 37 includes a common electrode 40a configured by integrating common electrodes 11a, 11c and a common electrode 40b configured by integrating common electrodes 11b, 11d.

A counter substrate 41 of the liquid crystal display 37 includes a counter electrode 42a configured by integrating counter electrodes 16a, 16c and a counter electrode 42b configured by integrating counter electrodes 16b, 16d.

A switching unit 43 can apply various driving voltages to the integrally configured pixel electrodes 38a, 38b by using liquid crystal driving elements 12a, 12b to enable various image displays including the gradation display. During sensing of photoreceptors 2a, 2b, short-wavelength light from short-wavelength solid-state light-emitting devices 35a, 35b is emitted at a fixed intensity for metering. A voltage of an almost fixed height is applied to the integrally configured pixel electrodes 38a, 38b at the timing used as a light-guiding electrode. In the present embodiment, the liquid crystal driving elements 12a, 12b apply a driving voltage for image display and a driving voltage for sensing of the photoreceptors 2a, 2b at different timings. It is assumed that light for image display is visible light and short-wavelength light emitted from the short-wavelength solid-state light-emitting devices 35a, 35b is, for example, ultraviolet light. Visible light emitted from visible light solid-state light-emitting devices 32a, 32b is emitted such that the visible light enters, for example, the right eye of the observer. At this point, the short-wavelength solid-state light-emitting devices 35a, 35b do not emit light and the photoreceptors 2a, 2b do not receive light.

Figure 10:
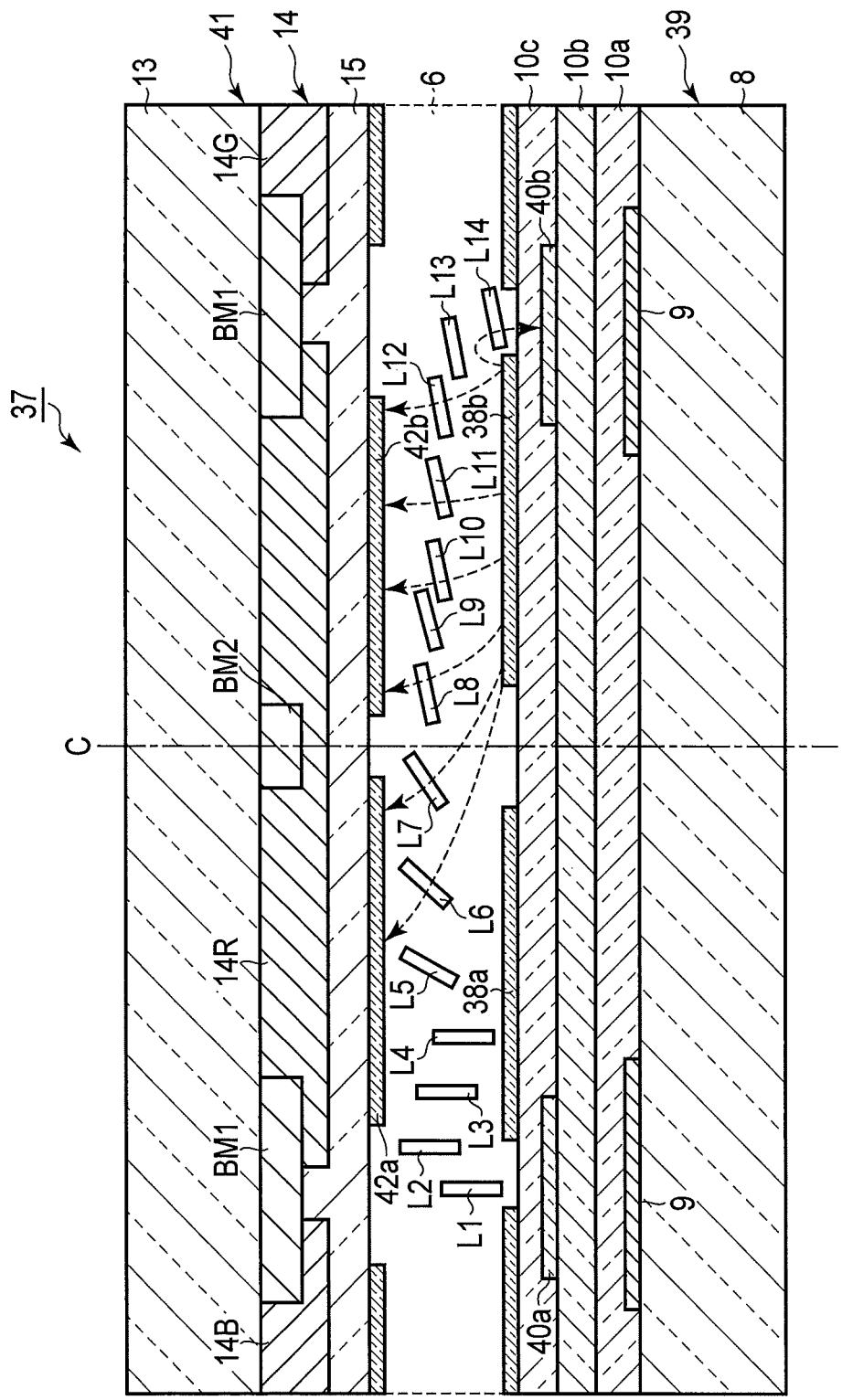
FIG. 10 is a partial sectional view showing an example of the state in which the liquid crystal driving voltage is applied to only a second pixel electrode of the liquid crystal display according to the second embodiment.

FIG. 10 is a partial sectional view showing an example of the state in which the liquid crystal driving voltage is applied to only the second pixel electrode 38b of the liquid crystal display 1 according to the present embodiment. Visible light emitted from visible light solid-state light-emitting devices 32a, 32b is emitted such that the visible light enters, for example, the left eye of the observer. At this point, the short-wavelength solid-state light-emitting devices 35a, 35b do not emit light and the photoreceptors 2a, 2b do not receive light.

Figure 11:
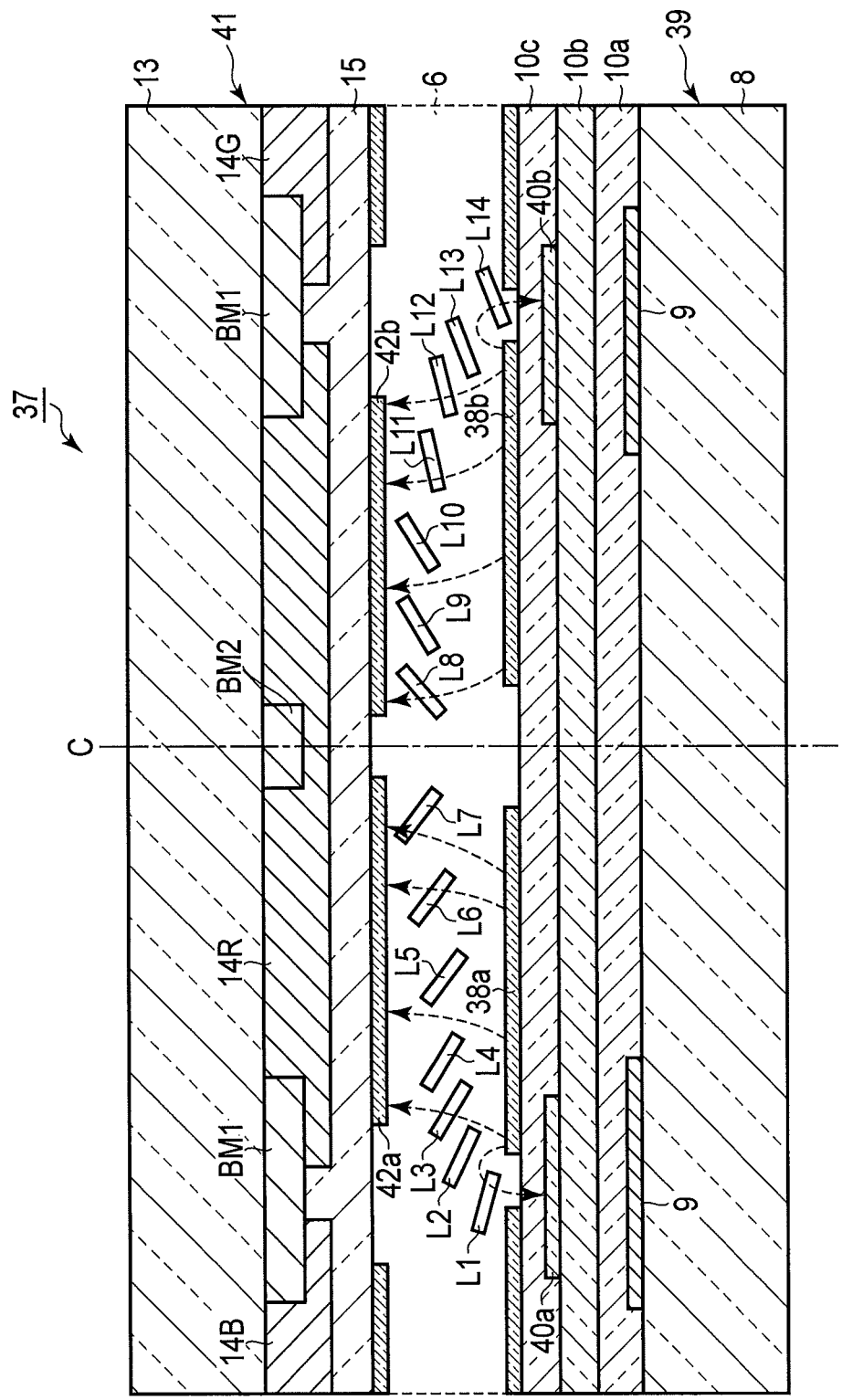
FIG. 11 is a partial sectional view showing an example of the state in which the liquid crystal driving voltage is applied to both of the pixel electrodes of the liquid crystal display according to the second embodiment.

FIG. 11 is a partial sectional view showing an example of the state in which the liquid crystal driving voltage is applied to both of the pixel electrodes 38a, 38b of the liquid crystal display 1 according to the present embodiment. After short-wavelength illumination light (for example, near ultraviolet light whose wavelength is 385 nm to 400 nm) is emitted from the short-wavelength solid-state light-emitting devices 35a, 35b, reflected light from the input instructor such as a finger enters the photoreceptor 2a so that the position, size, moving direction and the like of the input instructor are recognized. The application of a driving voltage for image display and the application of a driving voltage for sensing of the photoreceptors 2a, 2b are controlled by time division (field sequential). Short-wavelength illumination light for sensing of the photoreceptors 2a, 2b is emission light of a short-wavelength region where visual sensitivity of human eyes is low and therefore, the quality of image display is hardly degraded by the emission of the short-wavelength light.

When a driving voltage for two-dimensional image display is applied (at the timing when sensing of the photoreceptors 2a, 2b is turned off), liquid crystal molecules L1 to L14 operate as shown in FIG. 11 and also visible light is emitted from the visible light solid-state light-emitting devices 32a, 32b. As shown in FIG. 11, the liquid crystal molecules L1 to L14 fall symmetrically with respect to the center of the sub-pixel and also have a gradient and thus, a wide view angle previously unobtainable in the past can be gained. As will be described later, if, for example, a sub-pixel has a dogleg shape in the plan view, a still wider view angle can be gained in both the left and right direction and the up and down direction of the liquid crystal display 37. The wide view angle is realized in the present embodiment and also in other embodiments.

A technology similar to that in the present embodiment can be applied to a liquid crystal display in which the counter electrodes 42a, 42b shown in the present embodiment are removed and further, the configuration of the pixel electrodes 38a, 38b and the common electrodes 40a, 40b of the array substrate 39 is an electrode configuration of the fringe field mode including fine pectinate pixel electrodes used for IPS (liquid crystal horizontally oriented and driven by a transverse electric field) and solid common electrodes included via the pectinate pixel electrodes and an insulating layer. In the present embodiment, as described above, the direction of orientation and the driving method of liquid crystal are not limited.

(Third Embodiment)

In the present embodiment, a liquid crystal display in which a slit opening is formed in a black matrix BM and, for example, visible light and ultraviolet light for preventing recognition by third parties are emitted from the slit opening will be described.

In the present embodiment, for example, an oblique light opening in a slit shape is formed on two parallel long sides of the black matrix that segments pixels or sub-pixels whose outside shape in the plan view is polygonal. In the present embodiment, the oblique light includes oblique light of short-wavelength light and that of visible light. The oblique opening is an opening that emits near ultraviolet light of, for example, the wavelength 385 nm to 400 nm in an oblique direction from the display surface during sensing of the photoreceptors 2a, 2b and becomes an opening that emits visible light in an oblique direction when used for security purposes to prevent visual recognition by third parties.

FIG. 12 is a partial plan view showing an example of a liquid crystal display according to the present embodiment. FIG. 12 shows the state in the plan view (state viewed from the observer side) of a liquid crystal display 44 according to the present embodiment.

Figure 13:
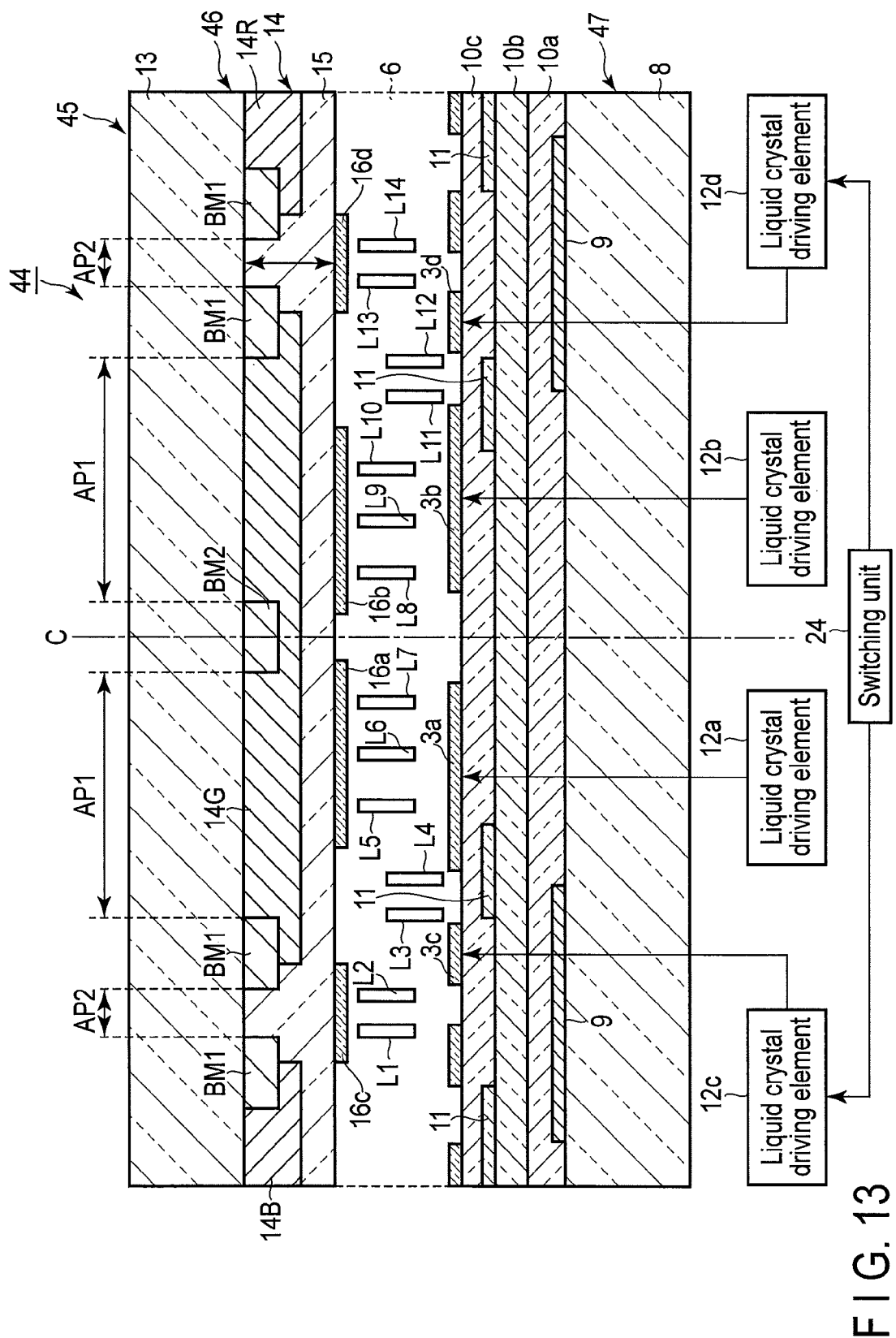
FIG. 13 is a partial plan view showing an example of the liquid crystal display according to the third embodiment.

FIG. 13 is a partial plan view showing an example of the liquid crystal display 44 according to the present embodiment. FIG. 13 shows a C-C' section of FIG. 12 and a section perpendicular to the long side (side edge) of a frame portion BM1 of the black matrix BM included in a liquid crystal display 1 and the major axis direction of pectinate or striped pixel electrodes. In FIG. 13, vertical orientation films, polarizing plates, and phase difference plates and the photoreceptors 2a, 2b shown in FIG. 12 are not illustrated. As will be described later, the liquid crystal display 44 according to the present embodiment can switch between the three-dimensional display and the normal two-dimensional display.

The array substrate 47 includes a transparent substrate 8, a light shielding film 9, an insulating layer 10a, a plurality of the photoreceptors 2a, 2b, an insulating layer 10b, a common electrode 11, an insulating layer 10c, pixel electrodes 3a, 3b for image display, light-guiding electrodes 3c, 3d for oblique light control, liquid crystal driving elements 12a, 12b for image display, and liquid crystal driving elements 12c, 12d for oblique light control.

The light shielding film 9 is formed from a metal thin film used for a gate wire or a source wire on one side of the transparent substrate 8 like, for example, glass.

The insulating layer 10a is formed on the transparent substrate 8 on which the light shielding film 9 is formed.

The photoreceptors 2a, 2b are included in, for example, neighboring pixels or sub-pixels. The plurality of photoreceptors 2a, 2b are formed on the insulating layer 10a.

The photoreceptor 2a detects light having passed through a blue filter 14B formed in a pixel opening AP1 of the black matrix BM, but light reflected inside a liquid crystal panel 45 may also be detected by the photoreceptor 2a. The photoreceptor 2a overlaps with the blue filter 14B and the light shielding film 9 in the plan view and is included between the blue filter 14B and the light shielding film 9 in a direction perpendicular to the section. The photoreceptor 2a is sensitive in a near ultraviolet region of the wavelength 360 nm to 420 nm.

The photoreceptor 2b detects light reflected inside the liquid crystal panel 45. Light detected by the photoreceptor 2b includes, for example, reflected light from various interfaces of the side of a counter substrate 46 and reflected light from the interface between the counter substrate 46 and a liquid crystal layer 6. The photoreceptor 2a overlaps with a red filter 14R or a green filter 14G of the pixel opening AP1 and the light shielding film 9 in the plan view and is included between the red filter 14R or the green filter 14G and the light shielding film 17 in a direction perpendicular to the section. The photoreceptor 2b is a photoreceptor for signal compensation.

The photoreceptor 2b according to the present embodiment is disposed between the green filter 14G and the light shielding film 9. The transmittance of near ultraviolet light near the wavelength 390 nm of, for example, the green filter 14G of a green sub-pixel and the red filter 14R of a red sub-pixel is low and thus, in the present embodiment, as described in the first embodiment or the like, there is no need to dispose the photoreceptor 2b between the black matrix BM and the light shielding film 9. Particularly, the transmittance of near ultraviolet light near the wavelength 390 nm of the green filter 14G containing a zinc halide phthalocyanine green pigment is lower than that of copper halide phthalocyanine and can be adopted as a light shielding pattern of near ultraviolet light. The transmittance of near ultraviolet light near the wavelength 390 nm when a yellow pigment as a color matching pigment is added to the green filter 14G or the red filter 14R is still lower.

In the present embodiment, the pixel aperture ratio of a blue sub-pixel, that of a green sub-pixel, and that of a red sub-pixel can be adjusted.

The insulating layer 10c is formed on the insulating layer 10b on which the plurality of photoreceptors 2a, 2b are formed.

The common electrode 11 is formed on the insulating layer 10b.

The pixel electrodes 3a, 3b for image display and the light-guiding electrodes 3c, 3d for oblique light control are formed on the insulating layer 10c.

The liquid crystal driving elements 12a, 12b for image display are electrically connected to the pixel electrodes 3a, 3b for image display.

The liquid crystal driving elements 12c, 12d for view angle control are electrically connected to the light-guiding electrodes 3c, 3d for oblique light control.

As the liquid crystal driving elements 12a, 12b for image display and the liquid crystal driving elements 12c, 12d for oblique light control, for example, a TFT in which a transparent channel layer is formed from an oxide semiconductor or the like is used.

For the array substrate 47, the other side of the transparent substrate 8 becomes the back side of the liquid crystal panel 45 and the side on which the pixel electrodes 3a, 3b and the light-guiding electrodes 3c, 3d are formed becomes the side of the liquid crystal layer 6.

The liquid crystal contained in the liquid crystal layer 6 is assumed to have, for example, an initial vertical orientation. Incidentally, the liquid crystal display 44 may be a VA liquid crystal type using the liquid crystal of initial vertical orientation or an ECB type using the liquid crystal of initial horizontal orientation. While a liquid crystal whose dielectric constant anisotropy is negative will be described as the VA liquid crystal below, a liquid crystal whose dielectric constant anisotropy is positive may also be used. A liquid crystal whose dielectric constant anisotropy is positive may be used as the VA liquid crystal.

The counter substrate 46 includes the transparent substrate 8, the black matrix BM, a color filter layer 14, a transparent resin layer (protective layer) 7, and counter electrodes 16a to 16d.

The black matrix BM corresponds to a plurality of pixels or sub-pixels and is formed on one side of the transparent substrate 13 such that a plurality of pixel openings AP1 segmented in a matrix shape in the plan view are formed. Light for image display provided to the user is emitted from the plurality of pixel openings AP1.

In the present embodiment, the black matrix BM is formed in pixel or sub-pixel units and includes two parallel long side portions of the frame portion BM1 forming the pixel opening AP1 and a center portion BM2 dividing the pixel opening AP1 into two portions. The center portion BM2 may be omitted.

Further, in the present embodiment, the black matrix BM includes an oblique light opening AP2 formed in a slit shape on long side portions opposite to each other in the horizontal direction in the plan view. Oblique light for the purpose of preventing visual recognition by third parties and short-wavelength light for sensing of the photoreceptor 2a are emitted from the oblique light opening AP2.

One of the blue filter 14B, the green filter 14G, and the red filter 14R is formed in the pixel opening AP1 formed by the black matrix BM on the transparent substrate 13. The color filter layer 14 contains the blue filter 14B, the green filter 14G, and the red filter 14R.

The transparent resin layer 15 is formed on the transparent substrate 13 on which the black matrix BM and the color filter layer 14 are formed.

The counter electrodes 16a to 16d are formed on the transparent resin layer 15.

For the counter substrate 46, the other side of the transparent substrate 13 becomes the observer side and the side on which the counter electrodes 16a to 16d are formed becomes the side of the liquid crystal layer 6.

In the present embodiment, the counter substrate 46 shown in the section of FIG. 13 is configured to be symmetric with respect to the center axis C of the sub-pixel.

The pixel opening AP1 of a polygonal sub-pixel is formed in a matrix shape. The plane shape of the pixel opening AP1 can be a polygonal shape in which sides opposite to each other are parallel like, for example, a square, a rectangle, a parallelogram, or a polygonal bent shape like a dogleg ("<" shape or a boomerang shape). In the counter substrate 46, the transparent oblique light opening AP2 in a slit shape is formed in a center portion of side portions opposite to each other of the black matrix BM. In other words, the oblique light opening AP2 is sandwiched between linear light shielding portions in side portions of the black matrix BM.

As shown in FIG. 13, the oblique light opening AP2 is preferably provided on both sides (left and right) of a sub-pixel for finger recognition and prevention of visual recognition by third parties. If, for example, oblique light in the up and down direction is emitted by providing an oblique opening in upper and lower portions in the vertical direction of a sub-pixel in the plan view, the effect of suppressing visual recognition by third parties prying into the liquid crystal display screen from the side is small. The shape of the oblique light opening AP2 in the plan view is not limited to the slit shape or the stripe shape and may be a dot shape, an elliptic shape, a rectangular shape or the like. The arrangement of a plurality of the oblique light openings AP2 may be asymmetric or symmetric with respect to the center of a sub-pixel in the plan view. The oblique light opening AP2 is preferably arranged along the longer direction of sub-pixels.

In the present embodiment, the emission state of oblique light from the oblique light opening AP2 is related to the shape or position of the light-guiding electrodes 3c, 3d, the common electrode 11, and the counter electrodes 16a to 16d to drive the liquid crystal and the operation of the liquid crystal.

Therefore, oblique light can be caused to be emitted efficiently by adjusting the shape or position of the oblique light opening AP2 in accordance with the shape or position of the light-guiding electrodes 3c, 3d, the common electrode 11, and the counter electrodes 16a to 16d.

Incidentally, it is preferable that the emission direction of oblique light be approximately orthogonal to the optical axis of a prism sheet (ridge line direction of the prism sheet having a triangular section) contained in the configuration of an optical control element according to the fourth embodiment described later.

A switching unit 24 switches the intensity of oblique light emitted from the oblique light opening AP2 by a technique of, for example, changing the height of the voltage applied to the light-guiding electrodes 3c, 3d.

If the compensated observed value from the operation unit 17 indicates that a finger is approaching the liquid crystal display screen, the switching unit 24 can apply a higher voltage to the light-guiding electrodes 3c, 3d via the liquid crystal driving elements 12c, 12d to automatically increase the intensity of oblique light emission. By increasing the intensity of oblique light emission, it becomes possible to recognize the finger even if the distance from the liquid crystal display screen to the finger is, for example, 7 mm, which makes input providing a sense of clicking with a 3D button display on the liquid crystal screen easier to achieve. For the recognition of the finger, for example, compensated observed values obtained by performing a compensation operation based on observed values of the photoreceptors 2a, 2b are classified into sections of different sizes of two levels or a plurality of levels and the number of compensated observed values (for example, corresponding to the area of the finger on the liquid crystal screen) belonging to each section is determined or the speed of change of the number of compensated observed values belonging to each section and their positions are detected. Accordingly, the distance between the liquid crystal display screen and the input instructor such as the finger, pointer or the like and movement thereof can be recognized. The finger can also be sensed based on, after short-wavelength light and visible light (for example, blue light) are synchronized and emitted from the oblique light opening AP2, a shift (phase difference) of timing of receiving the wavelength light and visible light. By using photoreceptors of different light receiving characteristics, the positional accuracy of the input instructor such as the finger, pointer or the like can be improved.

For example, the switching unit 24 of the liquid crystal display 44 may include an instruction receiving unit or the liquid crystal display 44 may display a switching request on the screen to receive switching instructions. The switching unit 24 switches the emission state of oblique light in accordance with input switching instructions. For example, the switching unit 24 realizes the mode specified by the observer from among "Display priority mode" that does not emit oblique light, "Finger operation mode" to do finger input, and "Security mode" to prevent visual recognition by third parties. If "Security mode" is selected, the switching unit 24 causes emission of oblique light of high intensity as visible light. The intensity of emitted light is controlled, as described above, based on the liquid crystal driving voltage applied to the light-guiding electrodes 3c, 3d. The switching unit 24 causes short-wavelength solid-state light-emitting devices 35a, 35b to emit light during sensing of the photoreceptors 2a, 2b and applies a driving voltage to the light-guiding electrodes 3c, 3d in synchronization with the observation timing of the photoreceptors 2a, 2b.

Hereinafter, the operation of liquid crystal by the counter substrate 46 and the array substrate 47 and light emitted by the operation will be described using FIGS. 14 to 17.

Figure 14:
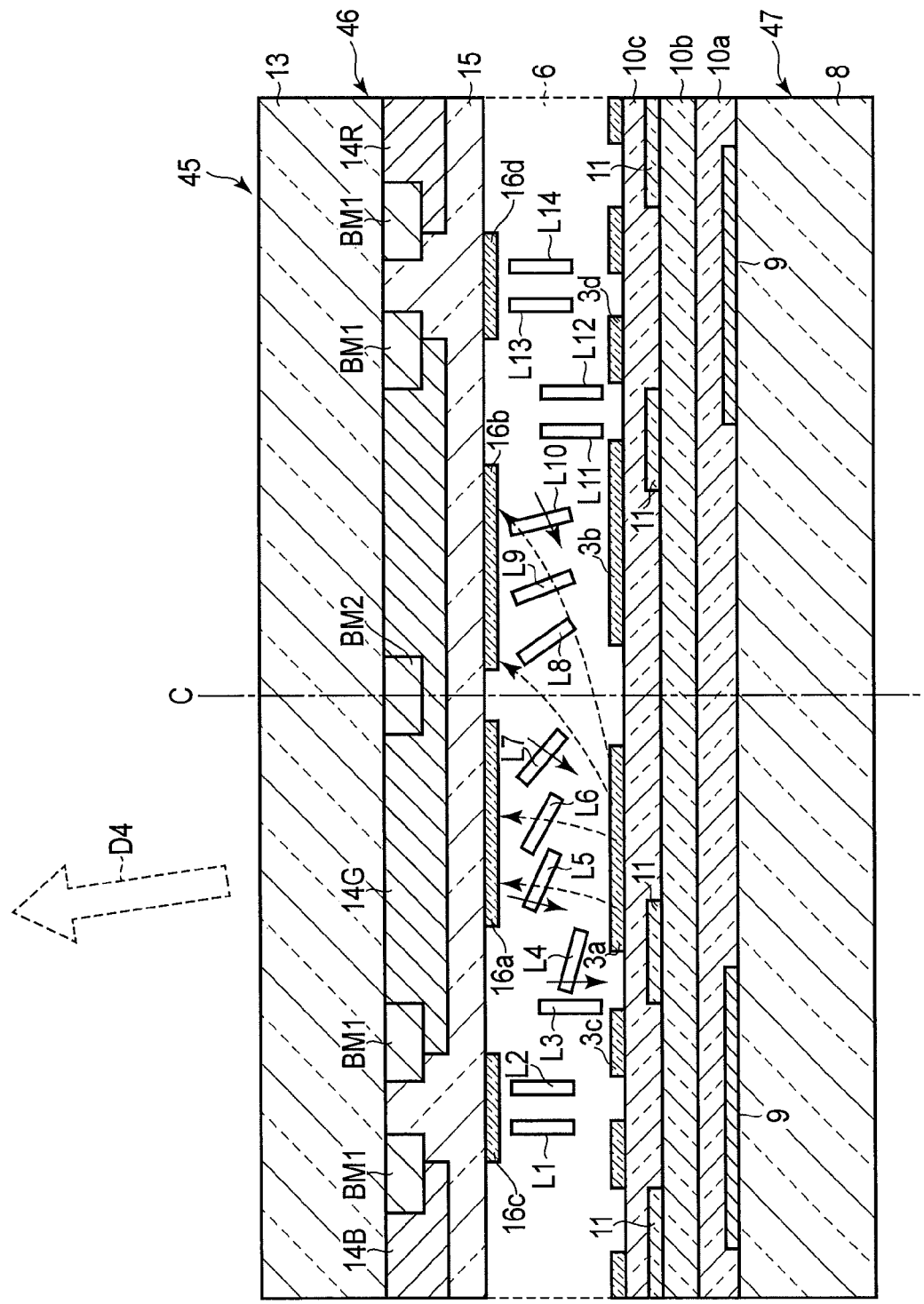
FIG. 14 is a partial sectional view showing an example of the state in which the liquid crystal driving voltage is applied to only a first pixel electrode of the liquid crystal display according to the third embodiment.

FIG. 14 is a partial sectional view showing an example of the state in which the liquid crystal driving voltage is applied to only the first pixel electrode 3a of the liquid crystal display 44 according to the present embodiment.

Liquid crystal molecules L1 to L14 of the liquid crystal display 44 have negative dielectric constant anisotropy. The major axis direction of the liquid crystal molecules L1 to L14 is vertical before a driving voltage is applied, but when a voltage is applied to any of the pixel electrodes 3a, 3b and the light-guiding electrodes 3c, 3d by the liquid crystal driving elements 12a to 12d, liquid crystal molecules are inclined. FIG. 14 shows an example of the driving state when the driving voltage is applied to only the first pixel electrode 3a.

The liquid crystal molecules L4 to L10 fall in a direction perpendicular to the electric line of force. Emission light D4 is emitted, for example, in the direction of one eye (right eye) of the observer by passing through an inclined portion of the liquid crystal. The liquid crystal molecule L4 starts to fall earlier than other liquid crystal molecules due to a strong electric field formed between an end of the pixel electrode 3a and the common electrode 11. The operation of the liquid crystal molecule L24 serves as a trigger of the liquid crystal operation and enhances responsiveness of the liquid crystal.

Figure 15:
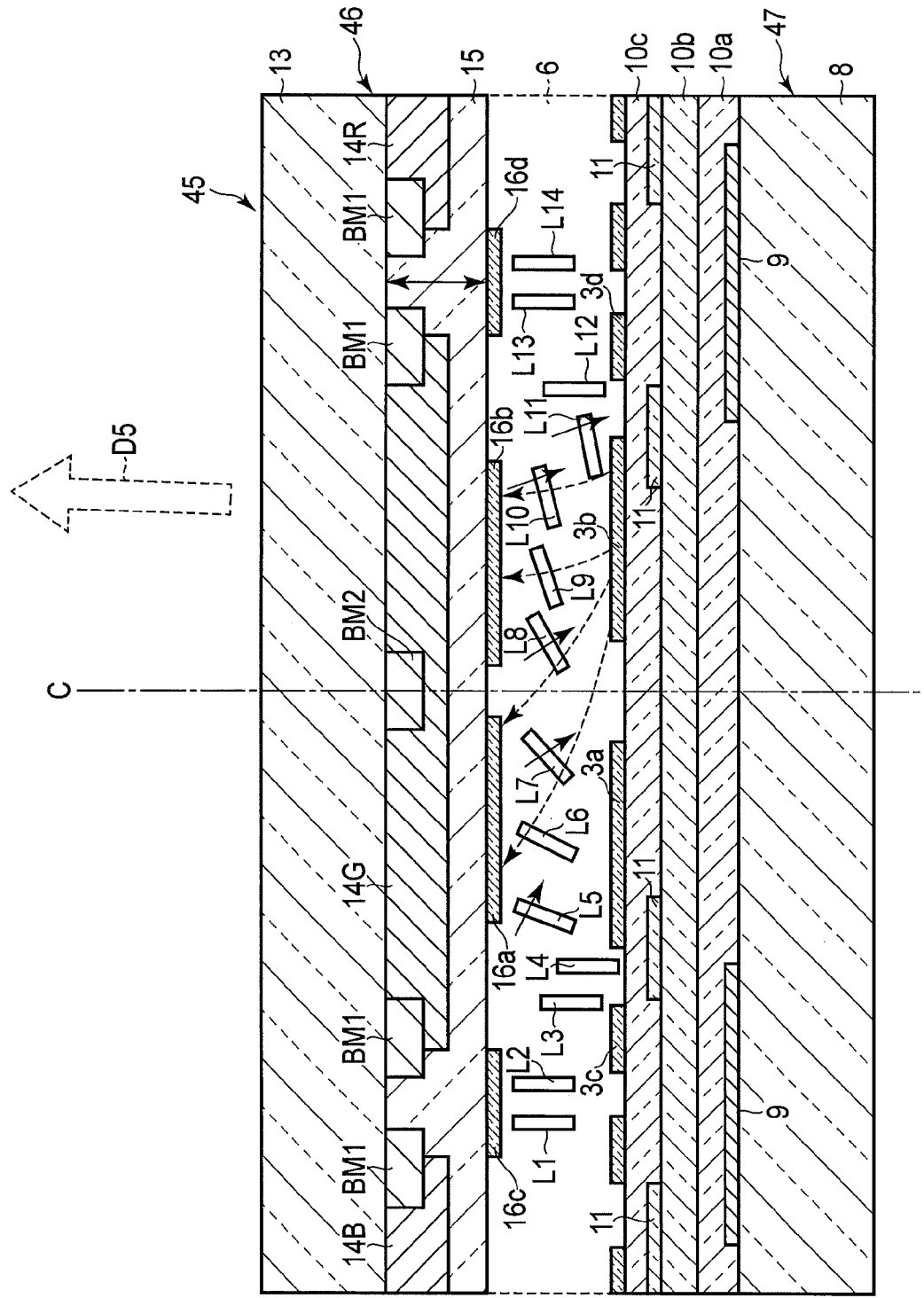
FIG. 15 is a partial sectional view showing an example of the state in which the liquid crystal driving voltage is applied to only a second pixel electrode of the liquid crystal display according to the third embodiment.

FIG. 15 is a partial sectional view showing an example of the state in which the liquid crystal driving voltage is applied to only the second pixel electrode 3b of the liquid crystal display 1 according to the present embodiment.

When a liquid crystal driving voltage is applied to the pixel electrode 3b, the liquid crystal molecules L5 to L11 fall in a direction perpendicular to the electric line of force. Emission light D5 is emitted, for example, in the direction of one eye (left eye) of the observer by passing through an inclined portion of the liquid crystal. The liquid crystal molecule L11 starts to fall earlier than other liquid crystal molecules due to a strong electric field formed between an end of the pixel electrode 3b and the common electrode 11. The operation of the liquid crystal molecule L11 serves as a trigger of the liquid crystal operation and enhances responsiveness of the liquid crystal.

Figure 16:
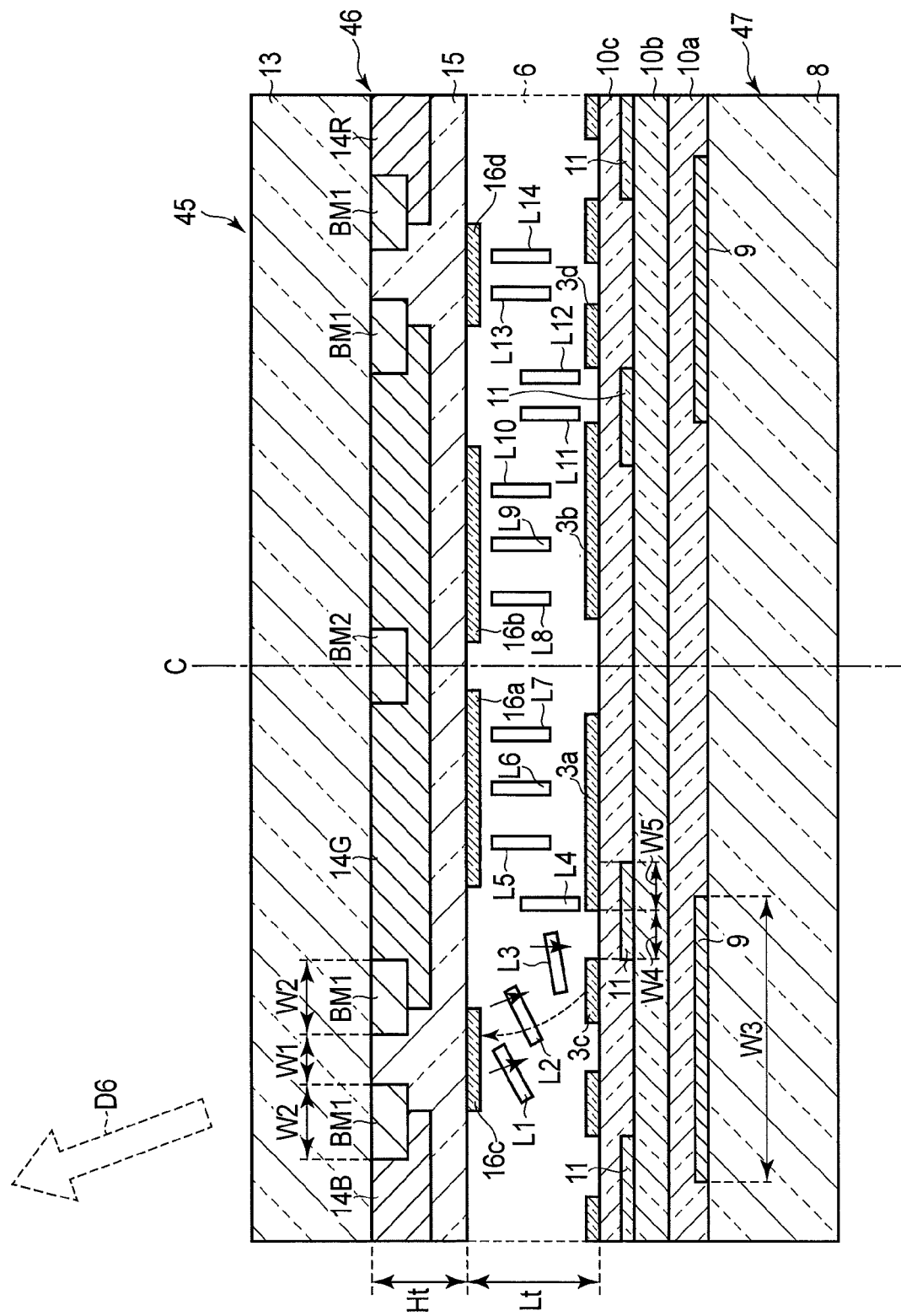
FIG. 16 is a partial sectional view showing an example of the state in which the liquid crystal driving voltage is applied to only a first light-guiding electrode of the liquid crystal display according to the third embodiment.

FIG. 16 is a partial sectional view showing an example of the state in which the liquid crystal driving voltage is applied to only the first light-guiding electrode 3c of the liquid crystal display 1 according to the present embodiment.

When a liquid crystal driving voltage is applied to the light-guiding electrode 3c, the liquid crystal molecules L1 to L3 fall in a direction perpendicular to the electric line of force. Oblique light D6 passes through the inclined liquid crystal molecules L1 to L3 obliquely and passes through a polarizing plate (not shown) before being emitted to the outside as leakage light. In this case, the leakage light is visually recognized as a black display from the observer direction, but the leakage light is observed by third parties in an oblique direction and is not visually recognized as a black display. Visual recognition by third parties around the observer can be prevented by a liquid crystal driving voltage being applied to the light-guiding electrode 3c and the oblique light D6 being caused to emit. Further, stable input by the photoreceptor 2a can be done by the oblique light D6 being caused to emit so that stable finger recognition can be realized while a finger operation is performed on the liquid crystal screen.

The amount of leakage light and the angle of the oblique light D6 can be controlled based on a width W1 of the oblique light opening AP2, a width W2 of the frame portion of the black matrix BM, a thickness Ht from one side of the transparent substrate 13 to the interface of the counter substrate 46 on the side of the liquid crystal layer 6, a thickness Lt of the liquid crystal layer 6, a width W3 of the light shielding pattern 9 and the like.

The liquid crystal molecule L3 starts to fall earlier than other liquid crystal molecules due to a strong electric field formed between an end of the light-guiding electrode 3c and the common electrode 11. The operation of the liquid crystal molecule L3 serves as a trigger of the liquid crystal operation and enhances responsiveness of the liquid crystal.

Figure 17:
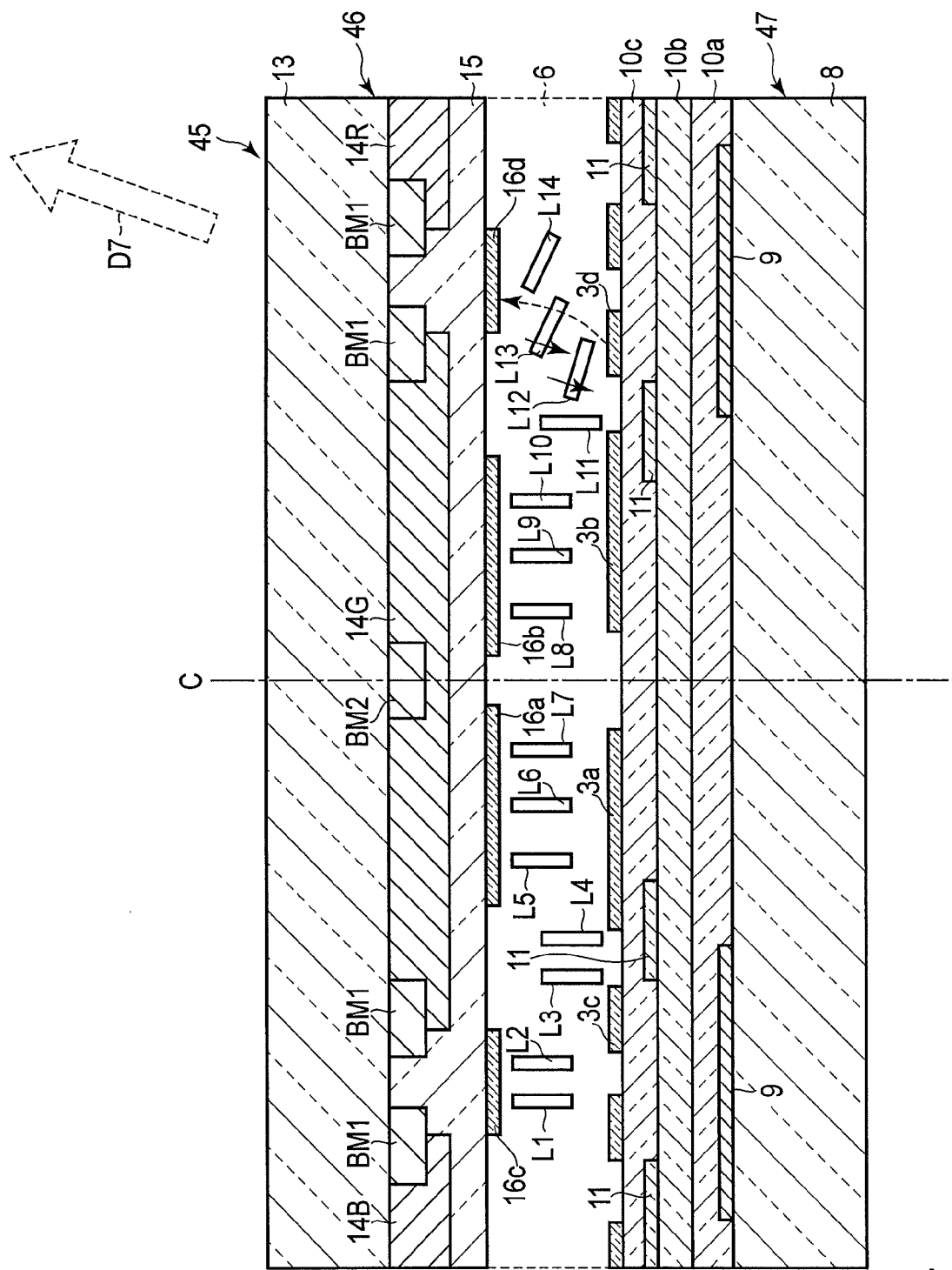
FIG. 17 is a partial sectional view showing an example of the state in which the liquid crystal driving voltage is applied to only a second light-guiding electrode of the liquid crystal display according to the third embodiment.

FIG. 17 is a partial sectional view showing an example of the state in which the liquid crystal driving voltage is applied to only the second light-guiding electrode 3d of the liquid crystal display 1 according to the present embodiment.

When a liquid crystal driving voltage is applied to the light-guiding electrode 3d, the liquid crystal molecules L12 to L14 fall in a direction perpendicular to the electric line of force and oblique light D7 is emitted. The liquid crystal molecule L12 starts to fall earlier than other liquid crystal molecules due to a strong electric field formed between an end of the light-guiding electrode 3d and the common electrode 11. The operation of the liquid crystal molecule L12 serves as a trigger of the liquid crystal operation and enhances responsiveness of the liquid crystal. The oblique light D7 is emitted by a driving voltage being applied to the light-guiding electrode 3d to prevent visual recognition by third parties around the observer. The oblique light D6 in FIG. 16 and the oblique light D7 in FIG. 17 may be caused to emit simultaneously.

In the present embodiment described above, the uniform photoreceptors 2a, 2b can be formed inside the liquid crystal panel 45 by the photoreceptors 2a, 2b being formed from an oxide semiconductor.

In the present embodiment, an observed value detected by the photoreceptor 2a can be compensated for by an observed value detected by the photoreceptor 2b and therefore, for example, finger input on the screen can be detected with high precision and stability.

In the present embodiment, input into the liquid crystal display 44 for three-dimensional image display can be detected.

In the present embodiment, with the emission of the oblique lights D6, D7, the view angle can be controlled and also an observed value of the photoreceptor 2a can be prevented from being adversely affected by reflected light inside the liquid crystal panel 45.

In the present embodiment, visible light is emitted from the oblique light opening AP2 to realize the prevention of visual recognition by third parties by synchronizing visible light solid-state light-emitting devices 32a, 32b of a backlight unit 30 with the light-guiding electrodes 3c, 3d to emit light.

In the present embodiment, an effective display area can be prevented from decreasing and the observer can be prevented from observing the oblique lights D6, D7 and therefore, display quality can be maintained.

In the present embodiment, the liquid crystal display 44 can be prevented from becoming heavy and thick.

(Fourth Embodiment)

In the present embodiment, a modification of the third embodiment will be described. The section of an oblique opening AP2 according to the present embodiment has a convex shape.

Figure 18:
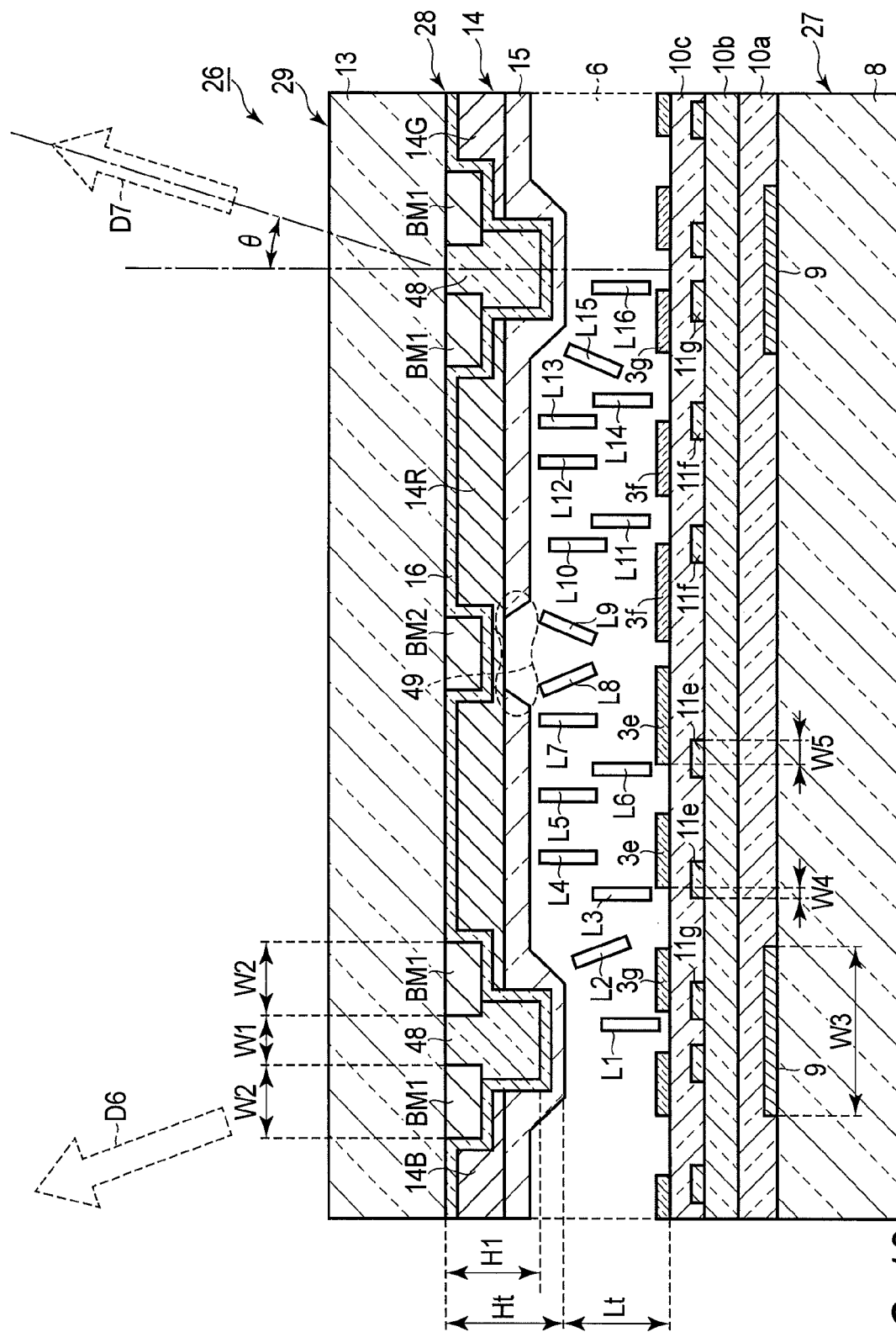
FIG. 18 is a partial sectional view showing an example of a liquid crystal display according to a fourth embodiment.

FIG. 18 is a partial sectional view showing an example of a liquid crystal display according to the present embodiment.

FIG. 18 is a section perpendicular to the longer direction of comb teeth of a pectinate or striped electrode. FIG. 18 shows orientation states of liquid crystal molecules L1 to L16 between a counter substrate and an array substrate and oblique lights D3, D4 emitted based on operations of these liquid crystal molecules L1 to L16 and orientation films, polarizing plates, liquid crystal driving elements, and phase difference plates, and photoreceptors are omitted. FIG. 18 shows an initial orientation state of the liquid crystal to which no liquid crystal driving voltage is applied.

A liquid crystal display 26 includes a liquid crystal panel 29 in which array substrate 27 and a counter substrate 28 are opposed to each other via a liquid crystal layer 6. The liquid crystal display 26 according to the present embodiment is characterized by a transparent pattern 48 provided in the oblique light opening AP2. The thickness Ht in the vertical direction of the transparent pattern 48 is larger than that in the vertical direction of a black matrix BM and that of a color filter layer 14. A formation portion of the transparent pattern 48 in the counter substrate 28 protrudes to the side of the liquid crystal layer 6 from other portions.

Further, a recess 49 is formed in the counter substrate 28 in the center portion of each sub-pixel.

To generate the counter substrate 28, the black matrix BM and the transparent pattern 48 in the oblique light opening AP2 are first formed on a transparent substrate 13 such as glass. Next, a counter electrode 16 as a transparent electrode is formed such as to cover the black matrix BM and the transparent pattern 48. A blue filter 14B, a green filter 14G, and a red filter 14R are stacked on the counter electrode 16 of respective pixel openings AP1 and further, a transparent resin layer 15 as a protective layer is formed.

The array substrate 27 includes pixel electrodes 3e, 3f, a light-guiding electrode 3g, and common electrodes 11e, 11f, 11g for each polygonal sub-pixel.

A voltage to drive the liquid crystal is applied to between the pixel electrodes 3e, 3f and the counter electrode 16 and between the pixel electrodes 3e, 3f and the common electrodes 11e, 11f. Incidentally, the array substrate 27 may not include the common electrodes 11e, 11f, 11g. The pattern in the plan view of the pixel electrodes 3e, 3f may be a pectinate pattern or a striped pattern. The pattern in the plan view of the of the pixel electrodes 3e, 3f may be formed in such way that a plurality of slit openings are arranged in a direction in which the liquid crystal molecules L3 to L14 are oriented on a band (solid) transparent conductive film.

An emission angle θ of the oblique lights D6, D7 can be controlled by using a width W1 of the transparent pattern 48, a thickness H1 of the transparent pattern 48, a thickness Lt of the liquid crystal layer 6, a width W3 of a light shielding pattern 9 and the like.

The pixel electrodes 3e, 3f and the light-guiding electrode 3g of a pectinate pattern and the common electrodes 11e, 11f, 11g of a pectinate pattern are arranged via an insulating layer 10c. The pixel electrodes 3e, 3f and the light-guiding electrode 3g, and the common electrodes 11e, 11f, 11g are shifted in positions in the horizontal direction. In FIG. 18, the pixel electrodes 3e, 3f and the light-guiding electrode 3g, and the common electrodes 11e, 11f, 11g partially overlap in the horizontal direction and another portion protrudes. The common electrodes 11e, 11f, 11g are shifted to the side of the transparent pattern 48 (end side of the sub-pixel) from the corresponding pixel electrodes 3e, 3f and the corresponding light-guiding electrode 3g.

The pectinate pattern of the pixel electrodes 3e, 3f and the light-guiding electrode 3g, and the common electrodes 11e, 11f, 11g is formed by electrically connecting two or more linear conductors of the width of, for example, 2 μm to 20 μm. The connecting portion of linear conductors may be formed on one side or on both sides. The connecting portion is a peripheral portion of the polygonal sub-pixel and is preferably arranged outside the pixel opening AP1 in the plan view. The interval of the pectinate pattern is set to the range of, for example, about 3 μm and 100 μm and is selected based on liquid crystal cell conditions and the liquid crystal material. The formation density, pitch, and electrode width of the pectinate pattern can be changed within the sub-pixel or the pixel. A protrusion amount W4 between the pixel electrodes 3e, 3f and the light-guiding electrode 3g, and the common electrodes 11e, 11f, 11g in the horizontal direction can be adjusted in various ways by the material of the liquid crystal 6, driving conditions, and dimensions of the thickness of liquid crystal cell and the like. The width W4 of protrusion may be a small amount, for example, a value between 1 μm and 6 μm. A width W5 of an overlapping portion can be used as an auxiliary capacity involved in liquid crystal driving. The liquid crystal molecules L1, L3 to L7, L10 to L14, L16 are oriented almost perpendicularly with respect to the substrate surface.

The number, density, and interval of comb teeth in an opening width direction of a sub-pixel or pixel in the pixel electrodes 3e, 3f and the light-guiding electrode 3g, and the common electrodes 11e, 11f, 11g of a pectinate pattern can appropriately be adjusted in accordance with the size and the purpose of use of the liquid crystal display 26.

In the present embodiment, a transparent conductive film as the counter electrode 16 is formed between the transparent substrate 13 and the color filter layer 14. In the present embodiment, when the counter substrate 28 is manufactured, the color filter layer 14 is formed after the transparent conductive film. In the liquid crystal display 26 configured as described above and including the counter substrate 28, even if light emitted from a backlight unit 30 is reflected by the interface of the counter electrode 16, the reflected light is absorbed by the color filter layer 14. Therefore, in the present embodiment, it is possible to mitigate light emitted from the backlight unit 30 installed on the back side of the liquid crystal panel 29 being reflected by the interface of the counter electrode 16 of the liquid crystal panel 29 and being observed by the photoreceptors 2a, 2b.

In the configuration of the counter electrode 15 in which, like the present embodiment, the color filter layer 14 or the transparent resin layer 15, which are also a dielectric, is stacked on the counter electrode 16, an equipotential line related to a liquid crystal driving voltage applied to between the pixel electrodes 3e, 3f and the counter electrode 16 can be extended in the thickness direction of the liquid crystal, which can improve the transmittance.

In the present embodiment, the liquid crystal molecules L2, L15 near the transparent pattern 15 of the counter substrate 28 and the liquid crystal molecules L8, L9 near the recess 49 in the center portion of the counter substrate 28 are inclined by a predetermined angle. Accordingly, the liquid crystal molecules L1 to L16 can effectively be inclined when a driving voltage is applied.

The oblique lights D6, D7 are one or both of visible light emitted from visible light solid-state light-emitting devices and short-wavelength light emitted from short-wavelength solid-state light-emitting devices. A synchronization control unit 36 synchronizes the application of a liquid crystal driving voltage to the light-guiding electrode 3g and light emission of one or both of visible light solid-state light-emitting devices 32a, 32b and short-wavelength solid-state light-emitting devices 35a, 35b. When the input instructor such as a finger is recognized, the synchronization control unit 36 synchronizes the application of a liquid crystal driving voltage to the light-guiding electrode 3g, light emission from the short-wavelength solid-state light-emitting devices 35a, 35b, and light reception by the photoreceptors 2a, 2b. The three-dimensional image display and the two-dimensional image display can be switched just as in the first embodiment. "Finger operation mode" or "Security mode" can be applied just as in the third embodiment.

While the formation position of the transparent conductive film in FIG. 18 is set between the black matrix BM and the color filter layer 14 in the present embodiment, the transparent conductive film may also be formed in other positions, like between the transparent substrate 13 and the black matrix BM.

(Fifth Embodiment)

In the present embodiment, the relationship between the plane shape of a sub-pixel and the shape of a pixel electrode will be described.

Figure 19:
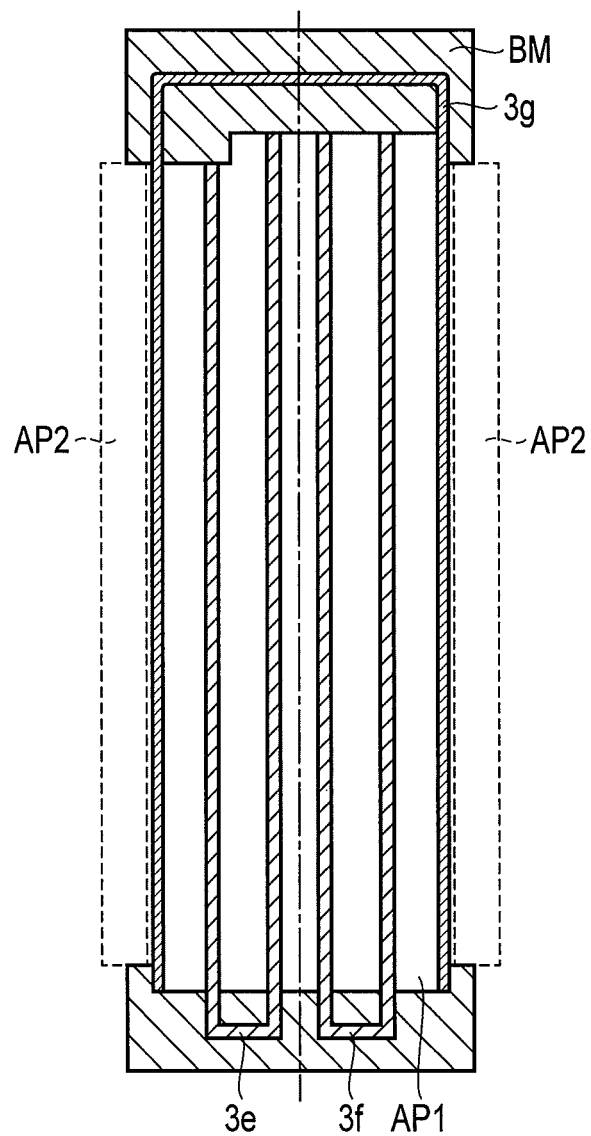
FIG. 19 is a plan view showing a first example of a relationship between a plane shape of a sub-pixel according to a fifth embodiment and shapes of pixel electrodes and a light-guiding electrode.

FIG. 19 is a plan view showing a first example of the relationship between the plane shape of a sub-pixel according to the present embodiment and shapes of pixel electrodes 3e, 3f and a light-guiding electrode 3g.

In FIG. 19, the sub-pixel has a rectangular shape long in the vertical direction in the plan view. The pixel electrodes 3e, 3f and the light-guiding electrode 3g as pectinate electrodes are each connected electrically to three different liquid crystal driving elements.

The light-guiding electrode 3g acts together with a corresponding common electrode 11g and drives the liquid crystal near an oblique light opening AP2 to emit oblique lights D6, D7. In the configuration of FIG. 19, the oblique light opening AP2 in a slit shape is formed in parallel with the light-guiding electrode 3g to emit oblique light passing through the liquid crystal driven by the light-guiding electrode 3g. In the present embodiment, the connecting portion of pectinate portions of the pixel electrodes 3e, 3f overlaps with a lower portion of a black matrix BM of the sub-pixel in the plan view. The connecting portion of pectinate portions of the light-guiding electrode 3g overlaps with an upper portion of the black matrix BM of the sub-pixel in the plan view. The number of comb teeth, density thereof, and electrode width of the pixel electrodes 3e, 3f and the light-guiding electrode 3g can be changed in various ways depending on liquid crystal cell conditions.

Figure 20:
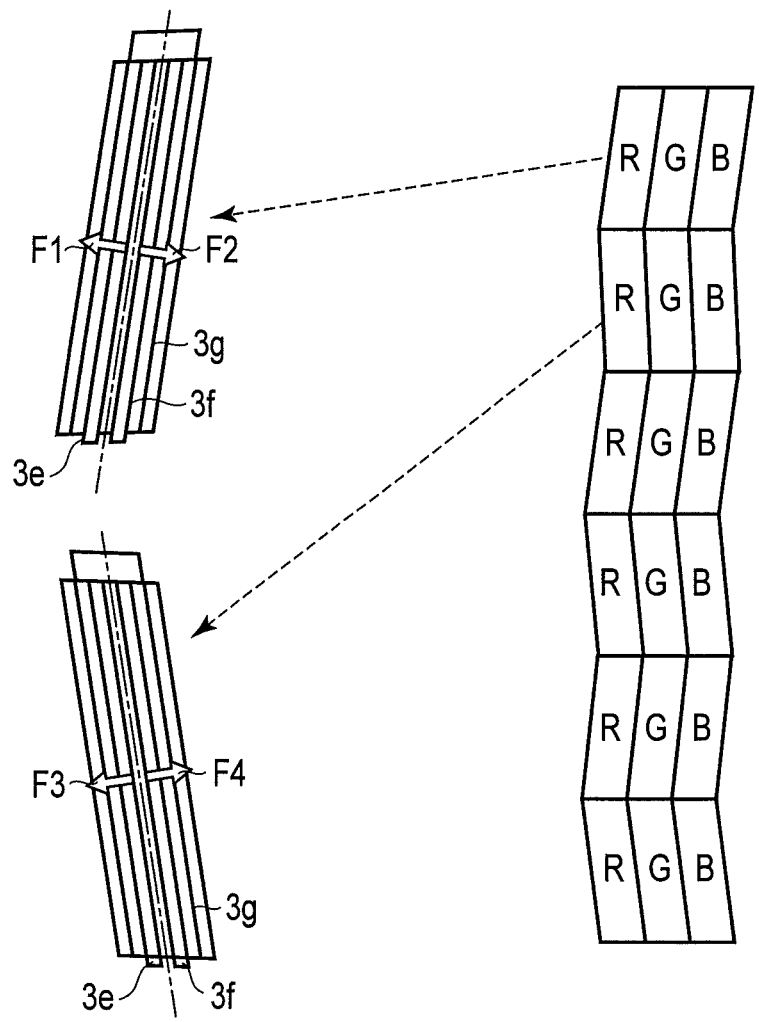
FIG. 20 is a plan view showing a second example of the relationship between the plane shape of the sub-pixel according to the fifth embodiment and shapes of the pixel electrodes and the light-guiding electrode.

FIG. 20 is a plan view showing a second example of the relationship between the plane shape of the sub-pixel according to the present embodiment and shapes of the pixel electrodes 3e, 3f and the light-guiding electrode 3g.

Figure 21:
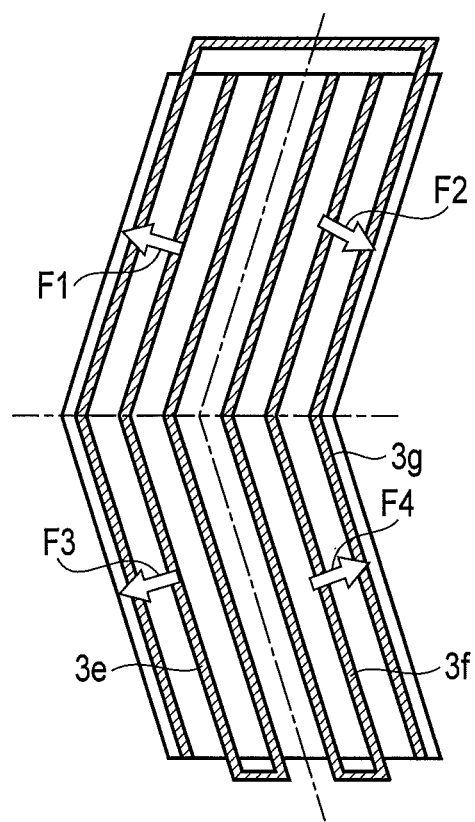
FIG. 21 is a plan view showing a third example of the relationship between the plane shape of the sub-pixel according to the fifth embodiment and shapes of the pixel electrodes and the light-guiding electrode.

FIG. 21 is a plan view showing a third example of the relationship between the plane shape of the sub-pixel according to the present embodiment and shapes of the pixel electrodes 3e, 3f and the light-guiding electrode 3g.

In FIG. 20, the sub-pixel has a parallelogrammic shape in the plan view. In FIG. 21, the sub-pixel has a polygonal shape like a dogleg in the plan view. F1 to F4 are inclination directions of the liquid crystal when a liquid crystal driving voltage is applied to the pixel electrodes.

If the emission direction of the oblique lights D6, D7 used for view angle control is considered, the plane shape of the sub-pixel is preferably a parallelogrammic shape or a polygonal shape like a dogleg. When characters are displayed on the liquid crystal display, visibility of third parties can easily be decreased in a wide range by applying a parallelogrammic sub-pixel in which the emission direction changes from sub-pixel to sub-pixel configured for the character display. When two to four liquid crystal driving elements are formed for each sub-pixel and the pixel electrodes 3e, 3f for pixel display and the light-guiding electrode 3g for view angle control are separately driven in each liquid crystal driving element, the contribution of the pixel shape factor decreases slightly. This is because when the pixel electrodes 3e, 3f for pixel display and the light-guiding electrode 3g for view angle control are separately driven, the oblique lights D6, D7 can be controlled by the light-guiding electrode 3g for view angle control separately from the pixel display. Further, when the pixel electrodes 3e, 3f for pixel display and the light-guiding electrode 3g for view angle control are separately driven, the driving voltage signal may be randomized and also the shape and arrangement of a transparent pattern 48 may be randomized to further decrease visibility of third parties by the oblique lights D6, D7 using the light-guiding electrode 3g for view angle control. The oblique lights D6, D7 can individually be caused to emit when necessary by forming two to four liquid crystal driving elements for each sub-pixel and visual recognition by third parties of the character display on the display screen can be prevented at a high level by randomization.

A synchronization control unit 36 synchronizes emission of visible light from visible light solid-state light-emitting devices 32a, 32b and application of a voltage to the light-guiding electrode 3g for oblique emission light for view angle control for the purpose of preventing visual recognition by third parties. When the input instructor such as a finger is recognized, the synchronization control unit 36 synchronizes emission of short-wavelength light from short-wavelength solid-state light-emitting devices 35a, 35b and application of a voltage to the light-guiding electrode 3g. The emission peak of the short-wavelength solid-state light-emitting devices 35a, 35b can beset to a low visual sensitivity region for human eyes and the emission peak of the visible light solid-state light-emitting devices 32a, 32b can be set to the emission peak of blue, green, or red as visible light. Photoreceptors 2a, 2b having a transparent channel layer formed of an oxide semiconductor can set the sensitivity by biasing towards the peak wavelength in the short-wavelength region of the short-wavelength solid-state light-emitting devices and thus, in the present embodiment, visible light and short-wavelength light may be emitted simultaneously as oblique light or visible light and short-wavelength light may be emitted in a time division manner.

(Sixth Embodiment)

In the present embodiment, the manufacture of liquid crystal driving elements 12a to 12d will be described. In the present embodiment, the liquid crystal driving elements 12a to 12d are assumed to have, for example, a top contact etching stopper structure of a bottom gate type.

According to the manufacturing method of the liquid crystal driving elements 12a to 12d according to the present embodiment, an aluminum alloy thin film is first formed to a thickness of 140 nm by the DC magnetron sputtering method. Next, the aluminum alloy thin film is patterned into a desired shape to form a gate electrode and an auxiliary capacitor electrode. Further, an $SiN_X$ thin film is formed thereon to a thickness of 350 nm by the plasma CVD method using $SiH_4$, $NH_3$, and $H_2$ as material gases to form a gate dielectric film as a transparent insulating layer. Further, an amorphous In—Ga—Zn—O thin film is formed as a transparent channel layer to a thickness of 40 nm by the DC sputtering method using an $InGaZnO_4$ target and patterned into a desired shape to form the transparent channel layer. Further, an SiON thin film is formed by the RF sputtering method while introducing Ar and $O_2$ using an SiN target and patterned into a desired shape to form a transparent channel protective layer. Further, an ITO thin film is formed to a thickness of 140 nm by the DC magnetron sputtering method and patterned into a desired shape to form a source/drain electrode. Further, an $SiN_X$ thin film is formed to a thickness of 500 nm by the plasma CVD method using $SiH_4$. $NH_3$, and $H_2$ as material gases to form a protective film.

Regarding the manufacturing method of photoreceptors 2a, 2b, the same method and process as those of the liquid crystal driving elements 12a to 12d can be applied to manufacture both products simultaneously. The top gate structure may be adopted for the liquid crystal driving elements 12a to 12d and the photoreceptors 2a, 2b as phototransistors. The liquid crystal driving elements 12a to 12d and the photoreceptors 2a, 2b may also have a single gate structure in which one formation region of the transparent channel layer is formed, a double gate structure in which two formation regions are formed, or a triple gate structure in which three formation regions are formed. Alternatively, the liquid crystal driving elements 12a to 12d and the photoreceptors 2a, 2b may have a dual gate structure including two gate electrodes arranged above and below a transparent channel layer region via a gate dielectric film. In such a multi-gate structure, different voltages can be applied to respective gate electrodes. In the present embodiment, the gate electrode is illustrated as an aluminum alloy thin film and the source/drain electrode is illustrated as an ITO thin film, but thin films of metals/alloys of titanium, tantalum, tungsten, molybdenum and the like can also be applied as electrode materials. Further, the liquid crystal driving elements 12a to 12d and the photoreceptors 2a, 2b may have a laminated structure containing a thin film of copper or aluminum. The aluminum alloy thin film may also be formed from an aluminum alloy to which at least one metal from neodymium (Nd), lanthanum (La), tantalum (Ta), zirconium (Zr), nickel (Ni), cobalt (Co), germanium (Ge), silicon (Si), magnesium (Mg), and copper (Cu) is added to aluminum in the quantity of 3 at % or less.

The sensitivity region of photoreceptors S1, S2 can be shifted to the visible region on the long-wavelength side of the wavelength of light by, for example, forming an impurity level in the transparent channel layer to make the band gap thereof smaller. For example, the thickness of the transparent channel layer can be adjusted in the range of 5 nm to 200 nm.

(Seventh Embodiment)

In the present embodiment, examples of various materials of transparent resins and organic pigments used in counter substrates 5, 41, 46 of liquid crystal displays 1, 37, 44 according to each of the above embodiments will be described.

Photosensitive coloring compositions used for the formation of a color filter layer 14 contain, in addition to a pigment dispersion, a multifunctional monomer, a photosensitive resin or non-photosensitive resin, a polymerization initiator, and a solvent. Highly transparent organic resins used in the present embodiment like a photosensitive resin or non-photosensitive resin are generically called transparent resins.

It is preferable to use a photosensitive resin composition capable of pattern formation by photolithography or a transparent resin of a thermoset resin or the like for a black matrix BM, a transparent resin layer 15, and the color filter layer 14. The resin used for the black matrix BM and the color filter layer 14 is preferably a resin having alkali solubility. The alkali soluble resin may be any resin containing the carboxyl group or hydroxyl group. As the alkali soluble resin, for example, an epoxy acrylate resin, a novolac resin, a polyvinyl phenol resin, an acrylic resin, an epoxy resin containing the carboxyl group, a urethane resin containing the carboxyl group and the like are used. Among these resins, the epoxy acrylate resin, the novolac resin, and the acrylic resin are preferable. Particularly, the epoxy acrylate resin or the novolac resin is preferable.

As red pigments, for example, C. I. Pigment Red 7, 9, 14, 41, 48:1, 48:2, 48:3, 48:4, 81:1, 81:2, 81:3, 97, 122, 123, 139, 146, 149, 168, 177, 178, 179, 180, 184, 185, 187, 192, 200, 202, 208, 210, 215, 216, 217, 220, 223, 224, 226, 227, 228, 240, 242, 246, 254, 255, 264, 272, 279 and the like can be used.

As red pigments, for example, C. I. Pigment Yellow 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 144, 146, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214 and the like can be used.

As blue pigments, for example, C. I. Pigment Blue 15, 15:1, 15:2, 15:3, 15:4, 15:6, 16, 22, 60, 64, 80 and the like can be used and, among these blue pigments, C. I. Pigment Blue 15:6 is preferable.

As violet pigments, for example, C. I. Pigment Violet 1, 19, 23, 27, 29, 30, 32, 37, 40, 42, 50 and the like can be used and, among these violet pigments, C. I. Pigment Violet 23 is preferable.

As green pigments used for a green filter 14G, for example, C. I. Pigment Green 1, 2, 4, 7, 8, 10, 13, 14, 15, 17, 18, 19, 26, 36, 45, 48, 50, 51, 54, 55, 58 and the like can be used and, among these green pigments, C. I. Pigment Green 58, which is a zinc halide phthalocyanine green pigment, is preferable. A green filter using a zinc halide phthalocyanine green pigment has a lower relative dielectric constant than a green filter of copper halide phthalocyanine, which has generally been used as a green pigment. By using a zinc halide phthalocyanine green pigment for the green filter 14G, the relative dielectric constant thereof can approximately be matched to those of a red filter 14R and a blue filter 14B contained in the color filter 14. If, for example, the relative dielectric constant of the blue filter 14B of a blue sub-pixel and the relative dielectric constant of the red filter 14R of a red sub-pixel in the respective thickness of 2.8 μm are measured when, for example, a voltage of 5 V is applied and the driving frequency of the liquid crystal is 120 Hz or 240 Hz, the measured relative dielectric constants fall within the range of about 3 to 3.9. The relative dielectric constant of the green filter 14G containing a zinc halide phthalocyanine green pigment as the main coloring material (a yellow pigment may be added for color adjustments) is 3.4 to 3.7 and the relative dielectric constant of the green filter 14G can be matched to those of the red filter 14R and the blue filter 14B of the other two colors. Matching the relative dielectric constants of the blue filter 14B, the green filter 14G, and the red filter 14R greatly affects the configuration in which the color filter layer 14 is formed on the transparent electrode (common electrode 16), as shown in the fourteenth embodiment or a liquid crystal display of the transverse electric field type called IPS. If the respective relative dielectric constants of the blue filter 14B, the green filter 14G, and the red filter 14R are at the same level, unwanted effects such as an occurrence of leakage of light due to different relative dielectric constants of the color filter when the liquid crystal is driven can be reduced. For example, the relative dielectric constant of the green filter 14G using copper halide phthalocyanine as the main coloring material is about 4.4 to 4.6, which is considerably larger than those of the blue filter 14B and the red filter 14R and is not preferable. In addition, the green filter 14G containing a zinc halide phthalocyanine green pigment has a steep spectral characteristic curve and has a higher transmittance than that of a copper halide phthalocyanine green pigment.

A mixture of the above various organic pigments can be used as a light blocking coloring agent used for the black matrix BM or carbon superior in the light blocking effect can be used.

Each of the above embodiments can be applied after modifications without deviating from the spirit of the invention and can also be freely combined.

What is claimed is:

1. A liquid crystal display comprising:
an array substrate including
a plurality of photoreceptors,
a plurality of electrodes, and
at least one liquid crystal driving element electrically connected to the plurality of electrodes;
a counter substrate including a black matrix corresponding to a plurality of sub-pixels or pixels and forming a plurality of pixel openings segmented in a matrix shape in a plan view and a color filter layer containing a blue filter, a green filter, and a red filter corresponding to the plurality of pixel openings;
a liquid crystal panel in which the array substrate and the counter substrate are opposed to each other via a liquid crystal layer; and
a backlight unit provided on a back side of the liquid crystal panel, and containing a solid-state light-emitting device, wherein
the solid-state light-emitting device includes a first light-emitting device that emits short-wavelength light of a wavelength 385 nm to 400 nm and a second light-emitting device that emits visible light,
the first light-emitting device is an InGaN light-emitting diode,
the plurality of electrodes includes
a light-guiding electrode that drives a liquid crystal contained in the liquid crystal layer to permit emission of the short-wavelength light through the liquid crystal layer, and
a pixel electrode that drives the liquid crystal contained in the liquid crystal layer to permit emission of the visible light through the liquid crystal layer;
the liquid crystal display further comprises a switching unit that controls an intensity of the short-wavelength light passing through the liquid crystal layer based on a liquid crystal driving voltage applied to the light-guiding electrode,
the switching unit is configured to operate the liquid crystal display in a display priority mode in which the short-wavelength light is not emitted through the liquid crystal layer, a finger operation mode to recognize a finger input by emission of the short-wavelength light, and a security mode to prevent visual recognition by third parties,
the switching unit operates the liquid crystal display in one of the display priority mode, the finger operation mode, and the security mode when the one of the modes is specified by a user,
the plurality of photoreceptors are each a phototransistor including a transparent channel layer containing two metallic oxides or more from gallium, indium, zinc, hafnium, tin, and yttrium, wherein the plurality of photoreceptors include a first photoreceptor that overlaps with the blue filter in the plan view and a second photoreceptor that overlaps with the green filter, the red filter, or the black matrix in the plan view,
the first photoreceptor has a light-receiving sensitivity in a range of the wavelength 360 nm to 420 nm to observe the short-wavelength light, and
the liquid crystal display further comprises an operation unit that determines a compensated observed value by subtracting an observed value of the second photoreceptor from an observed value of the first photoreceptor.

2. The liquid crystal display according to claim 1, further comprising:
a control unit that synchronizes an emission timing of the first light-emitting device and an observation timing of the first photoreceptor.

3. The liquid crystal display according to claim 1, wherein the light-guiding electrode further drives the liquid crystal contained in the liquid crystal layer to permit emission of the visible light through the liquid crystal layer, and the liquid crystal display further comprises:
a control unit that synchronizes an emission timing of the first light-emitting device and liquid crystal driving voltage application timing of the light-guiding electrode and synchronizes an emission timing of the second light-emitting device, which is different from the emission timing of the first light-emitting device, and a liquid crystal driving voltage application timing of the plurality of electrodes.

4. The liquid crystal display according to claim 1, wherein
a plurality of the liquid crystal driving elements are arranged for the pixel or the sub-pixel,
at least one of the plurality of liquid crystal driving elements arranged in the pixel or the sub-pixel is electrically connected to the light-guiding electrode, and
at least another one of the plurality of liquid crystal driving elements arranged in the pixel or the sub-pixel is electrically connected to the pixel electrode.

5. The liquid crystal display according to claim 1, wherein the first photoreceptor and the second photoreceptor are included in neighboring pixels or sub-pixels.

6. The liquid crystal display according to claim 1, wherein the black matrix includes an oblique light opening formed on two sides opposite to each other in the plan view and the plurality of electrodes contain the pixel electrode to drive the liquid crystal corresponding to the pixel opening and the light-guiding electrode to drive the liquid crystal corresponding to the oblique light opening.

7. The liquid crystal display according to claim 1, wherein the array substrate further includes a light shielding film and
the second photoreceptor is arranged at a position overlapping with the black matrix and the light shielding film in the plan view in a state sandwiched between the black matrix and the light shielding film in a sectional view to detect reflected light generated in the liquid crystal panel.

8. The liquid crystal display according to claim 1, wherein the array substrate further includes a light shielding film and
the second photoreceptor is arranged at a position overlapping with the green filter or the red filter and the light shielding film in the plan view in a state sandwiched between the green filter or the red filter and the light shielding film in a sectional view to detect reflected light generated in the liquid crystal panel.

9. The liquid crystal display according to claim 1, wherein the counter substrate includes
the black matrix formed on one side of a transparent substrate,
a transparent conductive film formed on the one side of the transparent substrate on which the black matrix is formed,
the color filter layer formed on the transparent conductive film, and
a transparent resin layer formed on the color filter layer.

10. The liquid crystal display according to claim 1, wherein
the counter substrate includes
the black matrix formed on one side of a transparent substrate,
the color filter layer formed on the one side of the transparent substrate on which the black matrix is formed,
a transparent resin layer formed on the color filter layer, and
a transparent conductive film formed on the transparent resin layer, wherein
the transparent conductive film is not formed at a position opposite to the plurality of photoreceptors.

11. The liquid crystal display according to claim 1, wherein
the green filter contains a zinc halide phthalocyanine green pigment as a main coloring material.

12. The liquid crystal display according to claim 1, wherein
the liquid crystal layer contains the liquid crystal in an initial vertical orientation.

13. The liquid crystal display according to claim 1, further comprising:
an optical control element included between the backlight unit and the liquid crystal panel to emit light radiated from the backlight unit in an oblique direction inclined with respect to a normal direction of the liquid crystal panel.

\* \* \* \* \*